US011379859B1

(12) United States Patent
Powers et al.

(10) Patent No.: US 11,379,859 B1
(45) Date of Patent: Jul. 5, 2022

(54) METHOD AND APPARATUS FOR PROVIDING AUTOMATED MARKET ANALYSIS TESTING

(71) Applicant: Groupon, Inc., Chicago, IL (US)

(72) Inventors: Christopher Powers, Waukegan, IL (US); Shafiq Shariff, Chicago, IL (US); Sridatta Viswanath, Palo Alto, CA (US); Logan Tyler Jennings, Chicago, IL (US); Will Megson, Chicago, IL (US); Derek Nordquist, Chicago, IL (US); Lori Kaplan, Menlo Park, CA (US); Amit Koren, Chicago, IL (US)

(73) Assignee: GROUPON, INC., Chicago, IL (US)

( * ) Notice: Subject to any disclaimer, the term of this patent is extended or adjusted under 35 U.S.C. 154(b) by 750 days.

(21) Appl. No.: 14/865,181

(22) Filed: Sep. 25, 2015

Related U.S. Application Data

(60) Provisional application No. 62/055,518, filed on Sep. 25, 2014.

(51) Int. Cl.
*G06Q 30/02* (2012.01)
(52) U.S. Cl.
CPC ................. *G06Q 30/0201* (2013.01)
(58) Field of Classification Search
CPC .................................................. G06Q 30/0201
USPC ........................................................ 705/7.29
See application file for complete search history.

(56) References Cited

U.S. PATENT DOCUMENTS 9,978,084 B1 * 5/2018 Sharma ................... G06F 17/16
10,163,129 B1 * 12/2018 Agarwal .................. G06N 5/04
2004/0177004 A1 * 9/2004 Mueller ................. G06Q 30/02
705/15
2009/0287541 A1 * 11/2009 Boardman ............. G06Q 30/02
705/7.31
2010/0274642 A1 * 10/2010 Shan ................... G06Q 30/0207
705/14.1

(Continued)

OTHER PUBLICATIONS

Yu-Chung Tsao, "Dynamic pricing, promotion and replenishment policies for a deteriorating item under permissible delay in payments", Science direct, Computers & Operations Research 35 (2008) 3562-3580, 2007. (Year: 2007).*

(Continued)

*Primary Examiner* — Rutao Wu
*Assistant Examiner* — Abdallah A El-Hage Hassan
(74) *Attorney, Agent, or Firm* — Alston & Bird LLP

(57) ABSTRACT

System, methods, and computer program products are provided herein for supporting electronic testing. An example of a method includes receiving a first electronic inquiry, determining parameters of the market analysis test based at least in part on the first electronic inquiry, determining a first configuration change for at least one first merchant device based at least in part on the parameters of the market analysis test, transmitting the first configuration change to the at least one first merchant device to initiate a change in configuration of the at least one first merchant device, receiving electronic marketing information comprising first electronic data related to the first configuration change, determining a correlation between at least one of the parameters of the market analysis test and the electronic marketing information, and transmitting an electronic notification of the correlation to a first merchant associated with the at least one first merchant device.

19 Claims, 10 Drawing Sheets

(56) References Cited

U.S. PATENT DOCUMENTS

| | | | |
|---|---|---|---|
| 2012/0066064 A1* | 3/2012 | Yoder | G06Q 30/00 |
| | | | 705/14.53 |
| 2013/0046642 A1* | 2/2013 | Jacobus | G06Q 50/12 |
| | | | 705/15 |
| 2013/0110770 A1* | 5/2013 | Stevelinck | G06F 16/214 |
| | | | 707/609 |
| 2014/0046757 A1 | 2/2014 | Kahn et al. | |
| 2014/0278815 A1* | 9/2014 | Grant | G06Q 30/0201 |
| | | | 705/7.36 |
| 2014/0279058 A1 | 9/2014 | Mullins et al. | |
| 2015/0278828 A1* | 10/2015 | Marcus | G06Q 30/0201 |
| | | | 705/7.29 |

OTHER PUBLICATIONS

Martin Natter, "An Assortmentwide Decision-Support System for Dynamic Pricing and Promotion Planning in DIY Retailing" Marketing science, vol. 26, No. 4, Jul.-Aug. 2007, pp. 576-583 issn0732-2399 eissn1526-548X 07 2604 0576, 2005 (Year: 2005).*

U.S. Appl. No. 14/041,890, filed Set. 30, 2013; In re: Shariff entitled *Automated Approval of Generated Promotions*.

U.S. Appl. No. 13/803,445, filed Mar. 14, 2013; In re: Shariff entitled *Method, Apparatus, and Computer Program Product for Sales Pipeline Automation*.

* cited by examiner

METHOD AND APPARATUS FOR PROVIDING AUTOMATED MARKET ANALYSIS TESTING

CROSS REFERENCE TO RELATED APPLICATIONS

This application claims priority to U.S. Provisional Application No. 62/055,518, filed Sep. 25, 2014, the entire contents of which are incorporated herein by reference

TECHNOLOGICAL FIELD

Example embodiments of the present invention relate generally to providing business analytic data and, more particularly, to methods, systems, and apparatuses for deriving business analytic data from electronic marketing information and providing the derived business analytic data to merchants using a merchant intelligence platform.

BACKGROUND

The applicant has discovered problems with current methods, systems, and apparatuses for providing business analytic data. Through applied effort, ingenuity, and innovation, Applicant has solved many of these identified problems by developing a solution that is embodied by the present invention, which is described in detail below.

BRIEF SUMMARY

Accordingly, a method, apparatus, and computer program product provide a merchant intelligence platform. Example embodiments may include a method for providing market analysis testing using a merchant intelligence platform. The method includes receiving a first electronic inquiry via a network interface. The first electronic inquiry includes a first request to initiate a market analysis test. The method also includes determining, using a processor, parameters of the market analysis test based at least in part on the first electronic inquiry, determining, using the processor, a first configuration change for at least one first merchant device associated with a first merchant based at least in part on the parameters of the market analysis test, transmitting, via the network interface, the first configuration change to the at least one first merchant device to initiate a change in configuration of the at least one first merchant device, receiving, via the network interface, electronic marketing information comprising first electronic data related to the first configuration change, determining, using the processor, a correlation between at least one of the parameters of the market analysis test and the electronic marketing information, and transmitting, via the network interface, an electronic notification of the correlation to a first merchant associated with the at least one first merchant device. The method may also include receiving a second electronic inquiry from a second merchant via the network interface. The second electronic inquiry may include a second request to participate in the market analysis test. The method may further include determining, using the processor, a second configuration change for at least one second merchant device associated with the second merchant based at least in part on the parameters of the market analysis test, and transmitting, via the network interface, the second configuration change to the at least one second merchant device to initiate a change in configuration of the at least one second merchant device, wherein the electronic marketing information further comprises second electronic data related to the second configuration change.

The method may also include determining that the first merchant does not provide a statistically significant sample size to identify a statistically significant correlation between the parameters of the market analysis test and the electronic marketing information, and allowing participation of the second merchant in the market analysis test in response to determining that the first merchant does not provide a statistically significant sample size. An ability of the first merchant to provide a statistically significant sample size may be determined at least in part based on prior transaction data provided by the first merchant. The first configuration change may be different from the second configuration change. The first configuration change may be at least one of a menu addition, a menu removal, an ambient light adjustment, a recipe ingredient change, or a price change. The method may also include determining an additional configuration change for the at least one first merchant device based at least in part on the parameters of the market analysis test. The additional configuration change may be different from the first configuration change, and transmitting the additional configuration change to the at least one first merchant device to initiate another change in configuration of the at least one first merchant device. The electronic marketing information may also include additional electronic data related to the additional configuration change. The method may further include determining that the electronic marketing information indicates a statistically significant sample size associated with the first configuration change. The method may also include reverting the first configuration change in response to determining that the electronic marketing information indicates the statistically significant sample size. In some embodiments, the method also includes determining the correlation in response to determining that the electronic marketing information indicates the statistically significant sample size.

Embodiments also include an apparatus for providing a merchant intelligence platform. The apparatus includes merchant intelligence management circuitry and analytic circuitry. The merchant intelligence management circuitry is configured to receive a first electronic inquiry. The first electronic inquiry includes a first request to initiate a market analysis test. The merchant intelligence management circuitry is further configured to provide the first request to analytics circuitry, to receive a first configuration change to at least one first merchant device from the analytics circuitry, to transmit the first configuration change to the at least one first merchant device, to receive electronic marketing information comprising first electronic data related to the first configuration change, to provide the electronic marketing information to the analytics circuitry, and to transmit an electronic notification of a correlation between at least one of the parameters of the market analysis test and the electronic marketing information to a first merchant associated with the at least one first merchant device. The analytics circuitry is configured to determine parameters of the market analysis test based at least in part on the first request, to initiate the market analysis test in response to receiving the first request and determining the parameters of the market analysis test, to determine the first configuration change for at least one first merchant device associated with a first merchant based at least in part on the parameters of the market analysis test, to provide the first configuration change to the merchant intelligence management circuitry, to receive the electronic marketing information from the merchant intelligence management circuitry, to determine the correlation, to generate the electronic notification of the correlation, and to provide the electronic notification of the correlation to the merchant intelligence management circuitry.

The merchant intelligence management circuitry may be further configured to receive a second electronic inquiry from a second merchant via the network interface. The second electronic inquiry includes a second request to participate in the market analysis test. The analytics circuitry may be further configured to determine a second configuration change for at least one second merchant device associated with the second merchant based at least in part on the parameters of the market analysis test, and the merchant intelligence management circuitry may be further configured to transmit the second configuration change to the at least one second merchant device to initiate a change in configuration of the at least one second merchant device. The electronic marketing information may include second electronic data related to the second configuration change. The analytics circuitry may be further configured to determine that the first merchant does not provide a statistically significant sample size to identify a statistically significant correlation between the parameters of the market analysis test and the electronic marketing information, and to allow participation of the second merchant in the market analysis test in response to determining that the first merchant does not provide a statistically significant sample size. An ability of the first merchant to provide a statistically significant sample size may be determined at least in part based on prior transaction data provided by the first merchant. The first configuration change may be different from the second configuration change. The first configuration change may be at least one of a menu addition, a menu removal, an ambient light adjustment, a recipe ingredient change, or a price change.

The analytics circuitry may be further configured to determine an additional configuration change for the at least one first merchant device based at least in part on the parameters of the market analysis test, wherein the additional configuration change is different from the first configuration change. The merchant intelligence management circuitry may be further configured to transmit the additional configuration change to the at least one first merchant device to initiate another change in configuration of the at least one first merchant device. The electronic marketing information may include additional electronic data related to the additional configuration change. The analytics circuitry may be further configured to determine that the electronic marketing information indicates a statistically significant sample size associated with the first configuration change. The merchant analytics circuitry may also be further configured to revert the first configuration change in response to determining that the electronic marketing information indicates the statistically significant sample size. The analytics circuitry may also be configured to determine the correlation in response to determining that the electronic marketing information indicates the statistically significant sample size.

Embodiments also include a non-transitory computer readable storage medium comprising instructions that, when executed by a processor, cause the processor to configure an apparatus to perform a market analysis test. The instructions cause the processor to configure the apparatus to perform the test by receiving a first electronic inquiry the first electronic inquiry comprising a first request to initiate a market analysis test, determining parameters of the market analysis test based at least in part on the first electronic inquiry, determining a first configuration change for at least one first merchant device associated with a first merchant based at least in part on the parameters of the market analysis test, transmitting the first configuration change to the at least one first merchant device to initiate a change in configuration of the at least one first merchant device, receiving electronic marketing information comprising first electronic data related to the first configuration change, determining a correlation between at least one of the parameters of the market analysis test and the electronic marketing information, and transmitting an electronic notification of the correlation to a first merchant associated with the at least one first merchant device. The instructions also cause the processor to configure the apparatus to receive a second electronic inquiry from a second merchant via the network interface, the second electronic inquiry comprising a second request to participate in the market analysis test, determine, a second configuration change for at least one second merchant device associated with the second merchant based at least in part on the parameters of the market analysis test, and transmit, via the network interface, the second configuration change to the at least one second merchant device to initiate a change in configuration of the at least one second merchant device. The electronic marketing information includes second electronic data related to the second configuration change.

The instructions may further cause the processor to configure the apparatus to determine that the first merchant does not provide a statistically significant sample size to identify a statistically significant correlation between the parameters of the market analysis test and the electronic marketing information, and to allow participation of the second merchant in the market analysis test in response to determining that the first merchant does not provide a statistically significant sample size. An ability of the first merchant to provide a statistically significant sample size may be determined at least in part based on prior transaction data provided by the first merchant. The first configuration change may be different from the second configuration change. The first configuration change may be at least one of a menu addition, a menu removal, an ambient light adjustment, a recipe ingredient change, or a price change. The instructions may further cause the processor to configure the apparatus to determine an additional configuration change for the at least one first merchant device based at least in part on the parameters of the market analysis test. The additional configuration change may be different from the first configuration change. The instructions may also cause the processor to configure the apparatus to transmit the additional configuration change to the at least one first merchant device to initiate another change in configuration of the at least one first merchant device. The electronic marketing information includes additional electronic data related to the additional configuration change. The instructions may further cause the processor to configure the apparatus to determine that the electronic marketing information indicates a statistically significant sample size associated with the first configuration change. The instructions may also cause the processor to configure the apparatus to revert the first configuration change in response to determining that the electronic marketing information indicates the statistically significant sample size. The instructions may further cause the processor to configure the apparatus to determine the correlation in response to determining that the electronic marketing information indicates the statistically significant sample size.

Embodiments may also include an apparatus for providing market analysis testing using a merchant intelligence platform. The apparatus includes means for receiving a first electronic inquiry via a network interface. The first electronic inquiry includes a first request to initiate a market analysis test. The apparatus also includes means for determining parameters of the market analysis test based at least in part on the first electronic inquiry, means for determining a first configuration change for at least one first merchant device associated with a first merchant based at least in part on the parameters of the market analysis test, means for transmitting the first configuration change to the at least one first merchant device to initiate a change in configuration of the at least one first merchant device, means for receiving electronic marketing information comprising first electronic data related to the first configuration change, means for determining a correlation between at least one of the parameters of the market analysis test and the electronic marketing information, and means for transmitting an electronic notification of the correlation to a first merchant associated with the at least one first merchant device.

The apparatus may also include means for receiving a second electronic inquiry from a second merchant via the second electronic inquiry comprising a second request to participate in the market analysis test, means for determining a second configuration change for at least one second merchant device associated with the second merchant based at least in part on the parameters of the market analysis test, and means for transmitting the second configuration change to the at least one second merchant device to initiate a change in configuration of the at least one second merchant device. The electronic marketing information further includes second electronic data related to the second configuration change. The apparatus may also include means for determining that the first merchant does not provide a statistically significant sample size to identify a statistically significant correlation between the parameters of the market analysis test and the electronic marketing information, and means for allowing participation of the second merchant in the market analysis test in response to determining that the first merchant does not provide a statistically significant sample size. An ability of the first merchant to provide a statistically significant sample size may be determined at least in part based on prior transaction data provided by the first merchant. The first configuration change may be different from the second configuration change. The first configuration change may be at least one of a menu addition, a menu removal, an ambient light adjustment, a recipe ingredient change, or a price change. The apparatus may also include means for determining an additional configuration change for the at least one first merchant device based at least in part on the parameters of the market analysis test. The additional configuration change may be different from the first configuration change. The apparatus may also include means for transmitting the additional configuration change to the at least one first merchant device to initiate another change in configuration of the at least one first merchant device. The electronic marketing information may include additional electronic data related to the additional configuration change. The apparatus may also include means for determining that the electronic marketing information indicates a statistically significant sample size associated with the first configuration change. The apparatus may further include means for reverting the first configuration change in response to determining that the electronic marketing information indicates the statistically significant sample size. The apparatus may also include means for determining the correlation in response to determining that the electronic marketing information indicates the statistically significant sample size.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
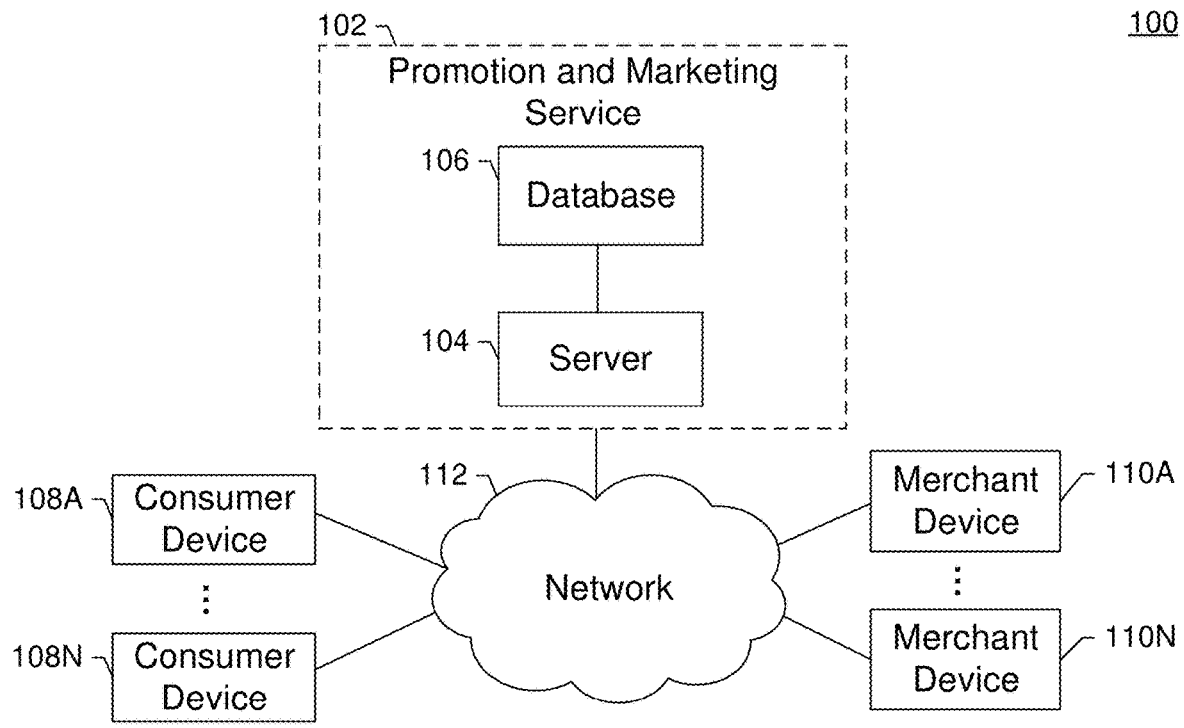
Figure 2:
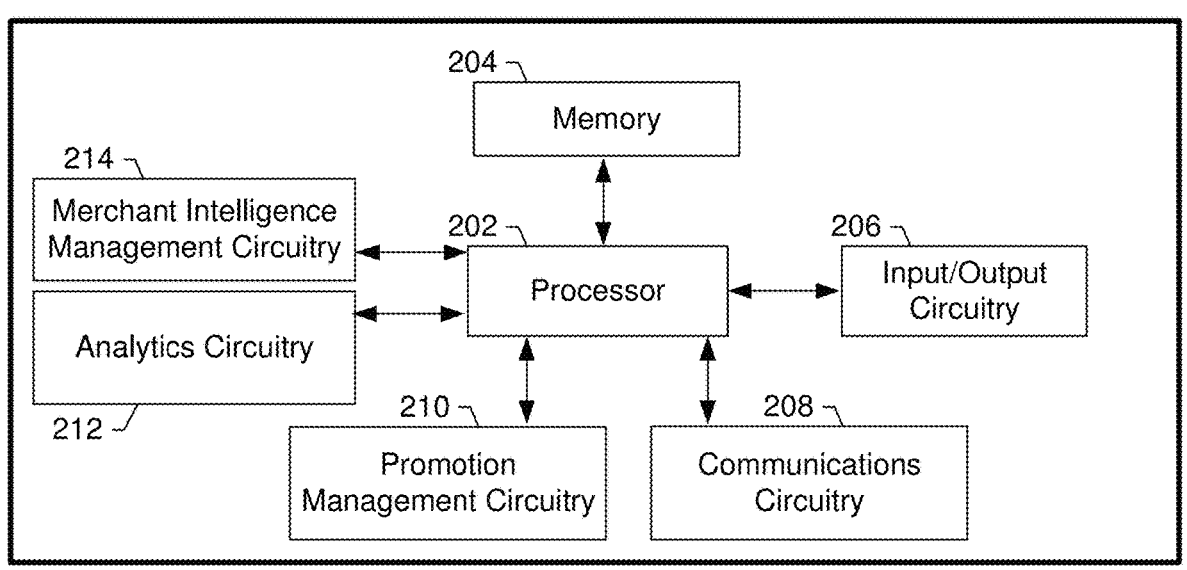
Figure 3:
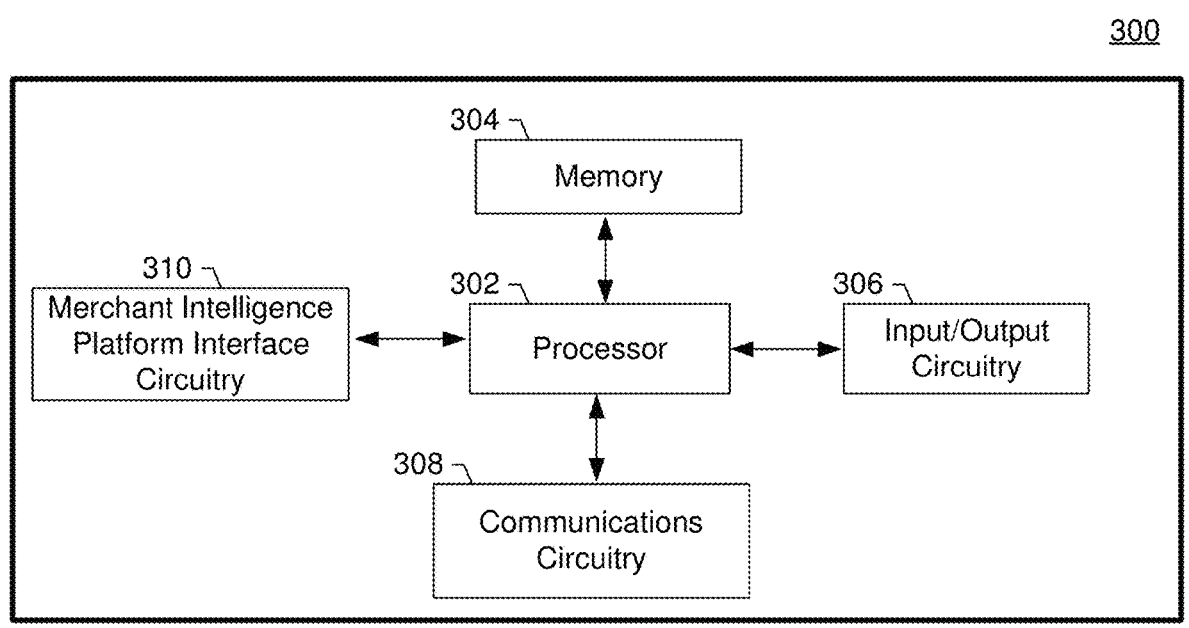
Figure 4:
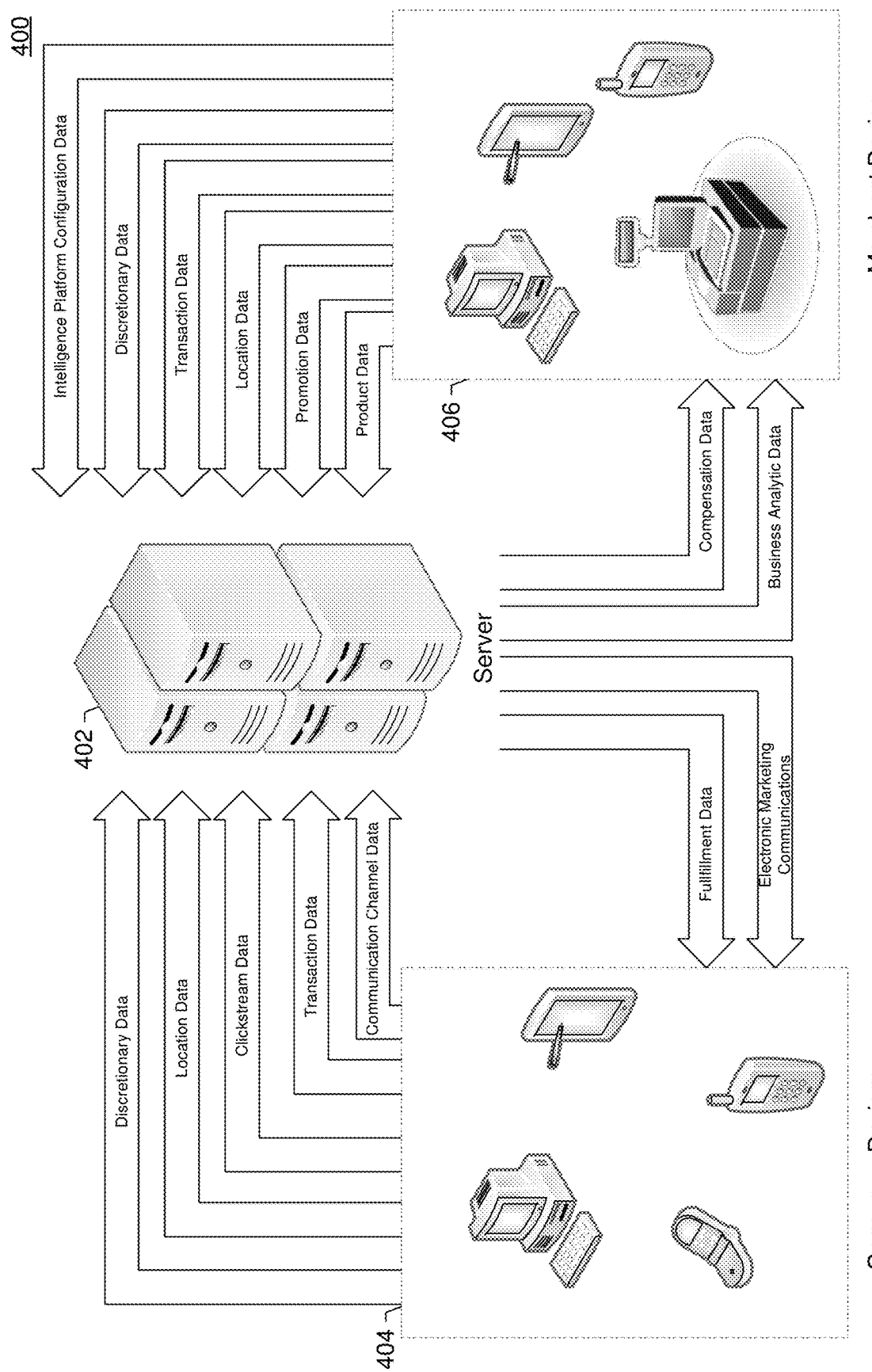
Figure 5:
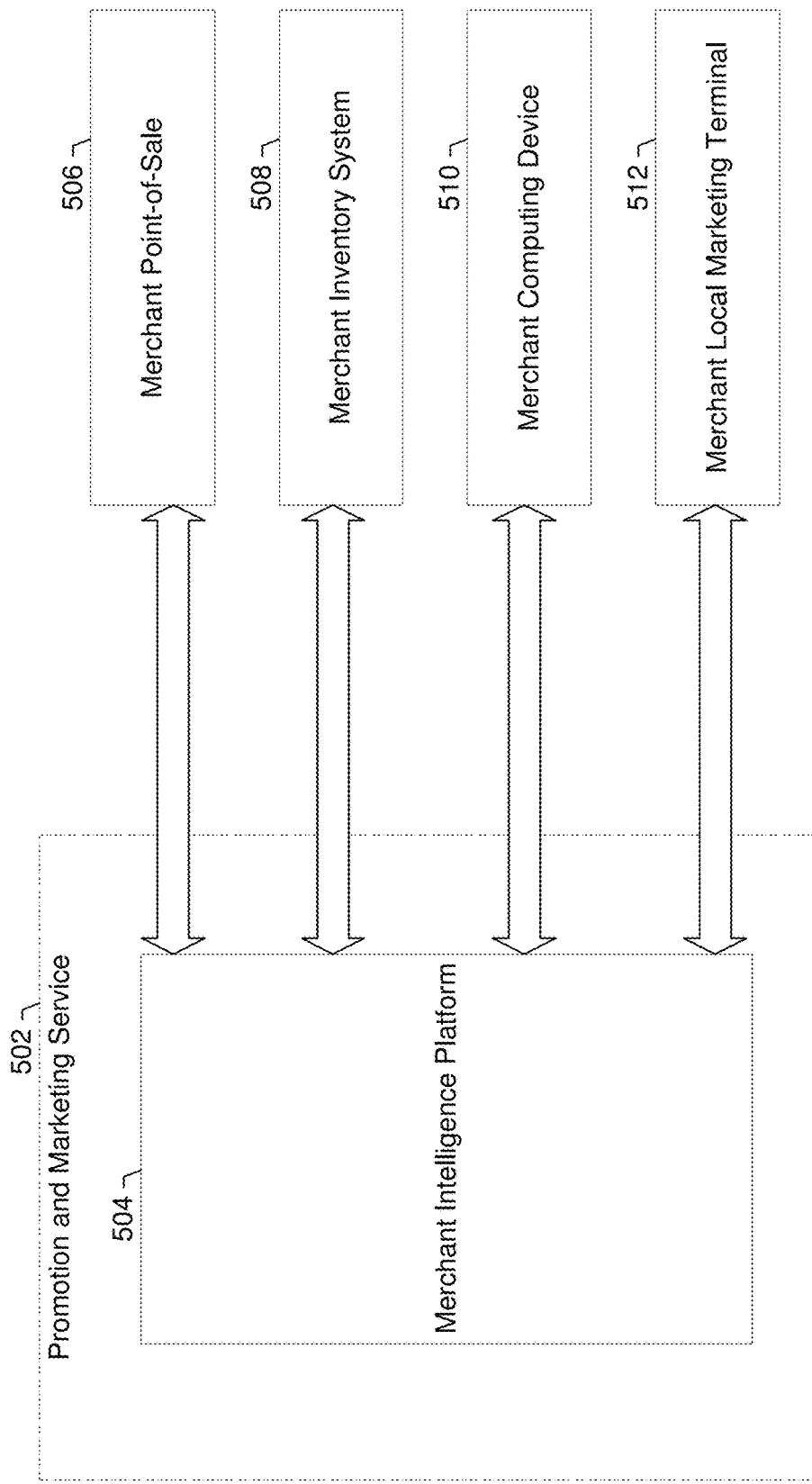
Figure 6:
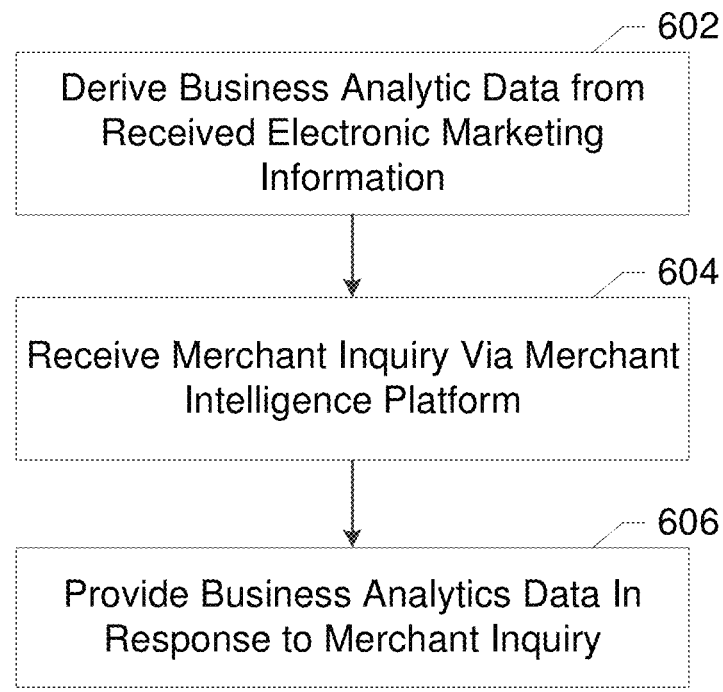
Figure 7:
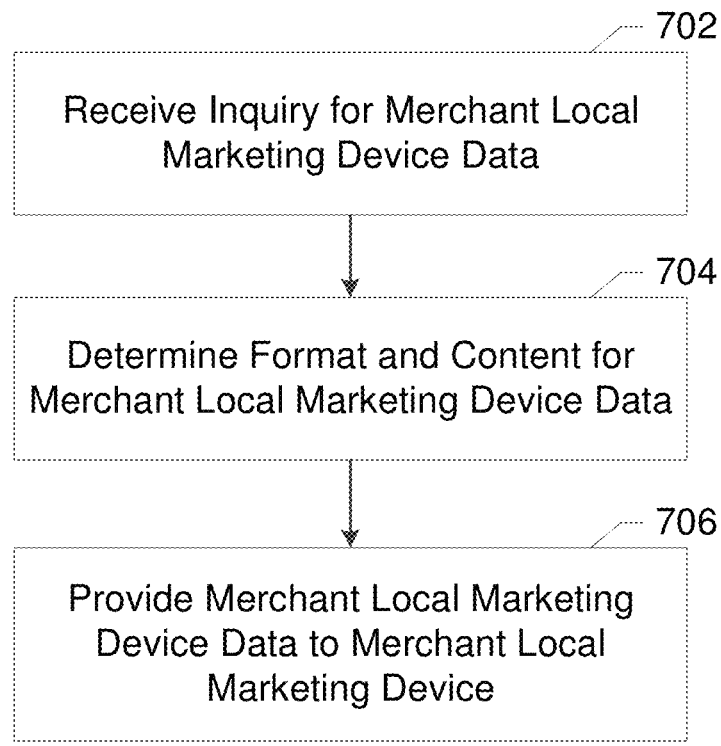
Figure 8:
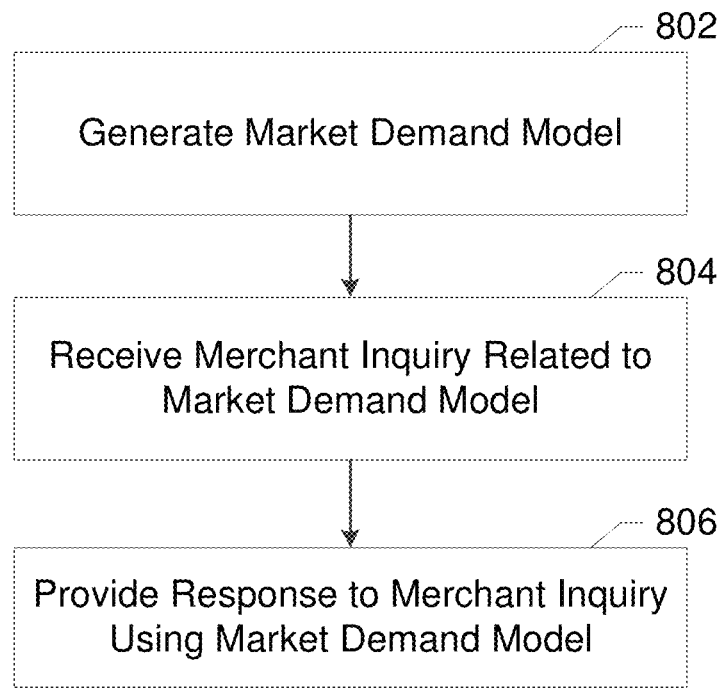
Figure 9:
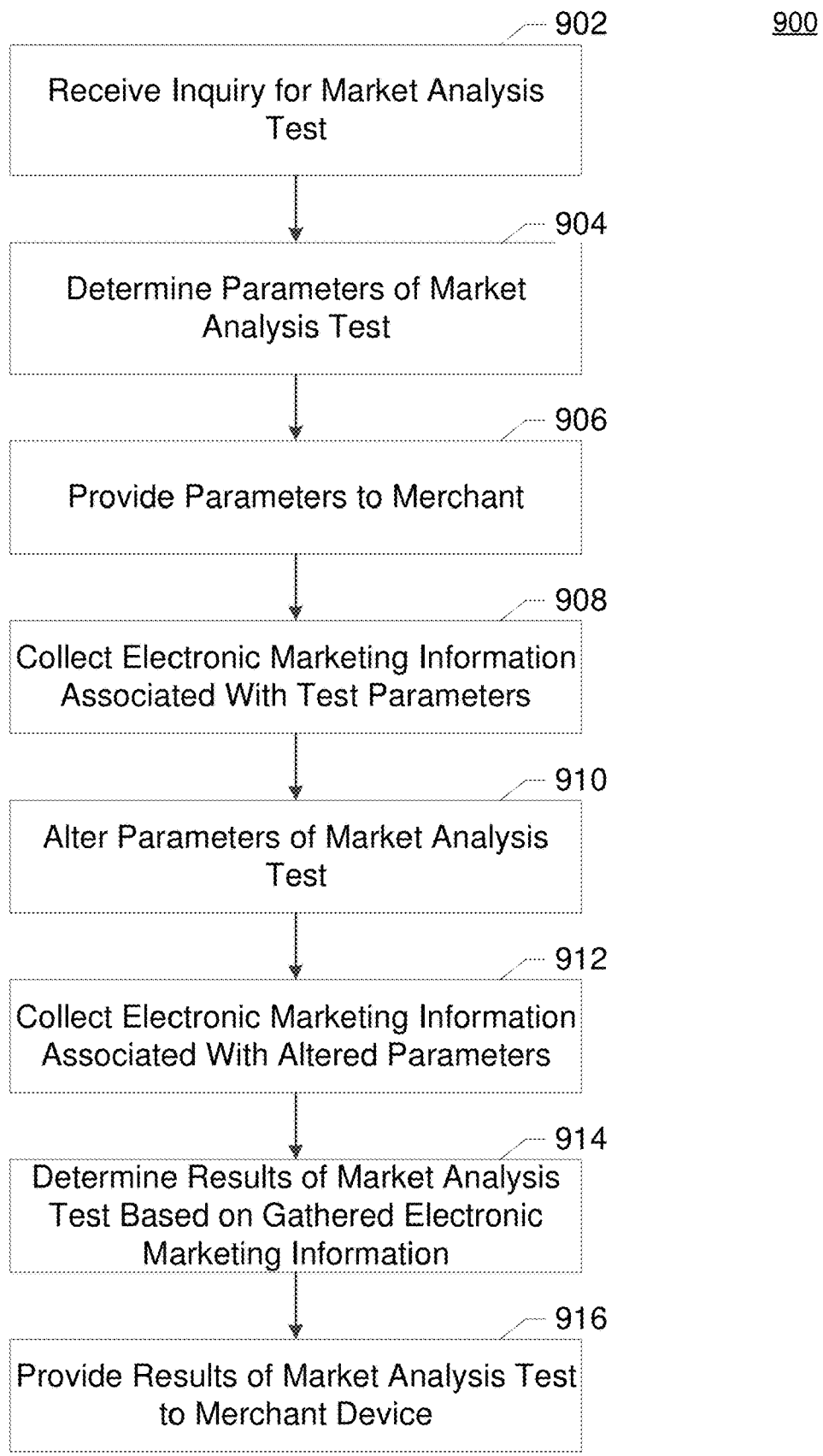
Figure 10:
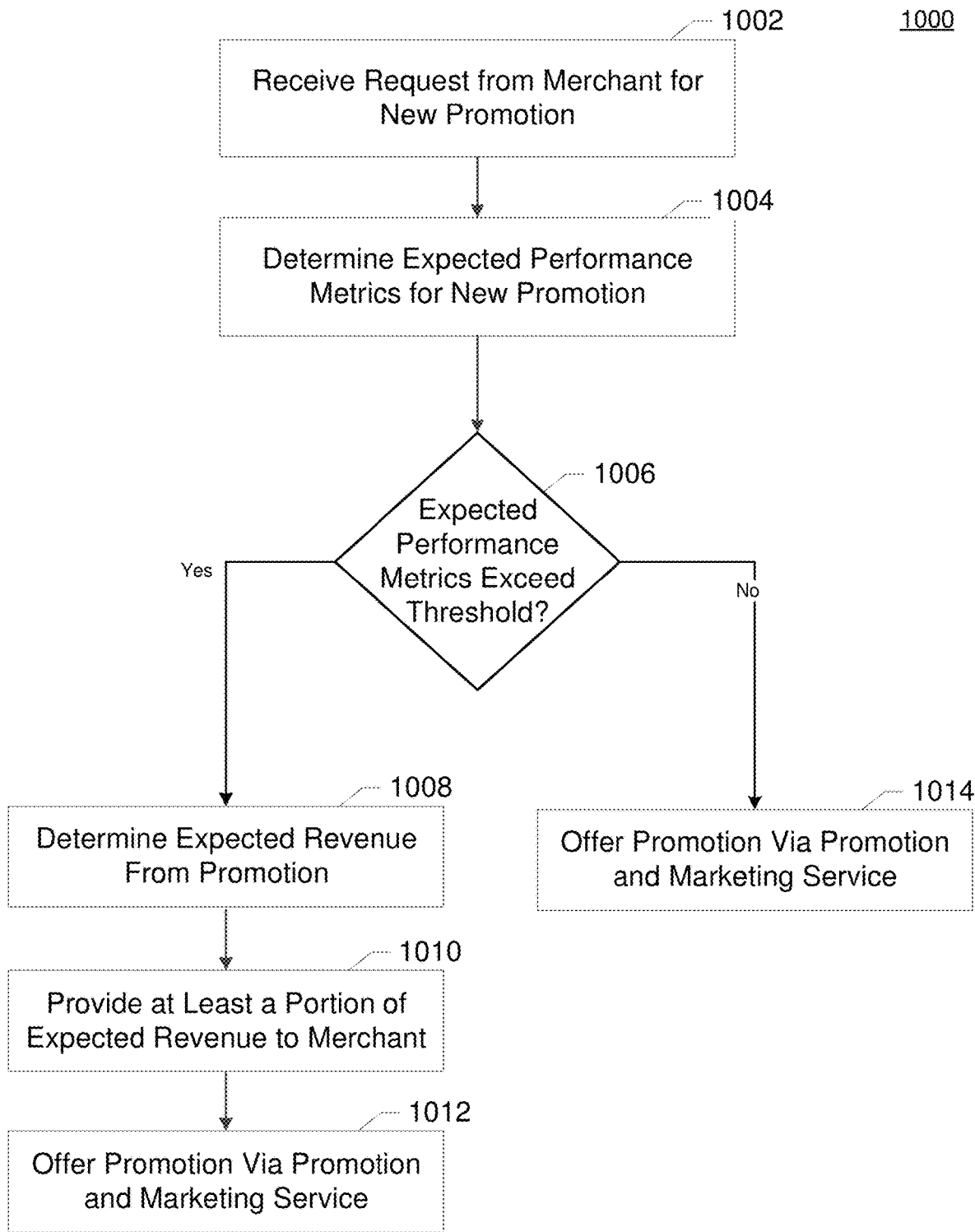
Figure 11:
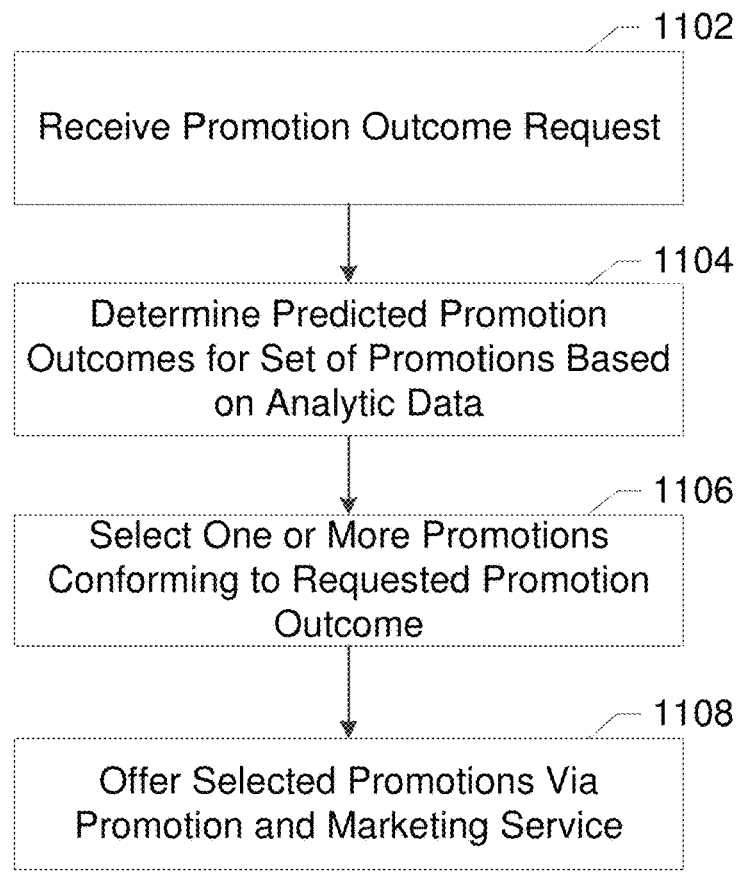

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for implementing a merchant intelligence platform using special-purpose circuitry in accordance with some example embodiments of the present invention;

FIG. 3 illustrates a block diagram showing an example device for interfacing with a merchant intelligence platform in accordance with some example embodiments of the present invention;

FIG. 4 illustrates an example data flow among a consumer device, a server, and a merchant device in accordance with some example embodiments of the present invention;

FIG. 5 illustrates an example data flow interaction between a merchant intelligence platform and various merchant devices in accordance with some example embodiments of the present invention;

FIG. 6 illustrates a flowchart describing example operations for providing business analytic data in accordance with some example embodiments of the present invention;

FIG. 7 illustrates a flowchart describing example operations for providing data to a merchant local marketing device in accordance with some example embodiments of the present invention;

FIG. 8 illustrates a flowchart describing example operations for providing business analytic data based on a market demand model in accordance with some example embodiments of the present invention;

FIG. 9 illustrates a flowchart describing example operations for providing programmatic market analysis testing in accordance with some example embodiments of the present invention;

FIG. 10 illustrates a flowchart describing example operations for programmatically providing improved merchant compensation operations in accordance with some example embodiments of the present invention; and FIG. 11 illustrates a flowchart describing example operations for providing automatic promotion generation in accordance with some example embodiments of the present invention.

DETAILED DESCRIPTION

Overview

Various embodiments of the present invention are directed to improved apparatuses, methods, and computer readable media for providing information to merchants. In this regard, embodiments of the present invention provide a merchant intelligence platform. The merchant intelligence platform is operable to provide merchants with a variety of data to assist the merchant with business decisions based on analytics derived from electronic data provided to a promotion and marketing service. To this end, the merchant intelligence platform may receive electronic marketing information from a variety of electronic sources, and process the data to generate business analytic data.

The merchant intelligence platform may provide a robust and flexible framework to support the operations of the merchant's business. In addition to providing "raw" data, such as charts and reports, the merchant intelligence platform may also be operable to respond to particular queries generated by merchants and to automate and/or control various processes and procedures associated with the merchant's business operations. For example, embodiments may provide merchants with information related to an expected return-on-investment (ROI) for particular promotions, as described in U.S. patent application Ser. No. 13/841,347, which is herein incorporated by reference in its entirety. Embodiments may also provide merchants with information related to capacity management (e.g., managing reservations and customer flow), as described in U.S. patent application Ser. No. 13/830,243, which is herein incorporated by reference in its entirety. Some embodiments may also assist the merchant with the promotion generation process based on expected performance for particular promotions and metrics associated with past performance of promotions in the same or a similar market as the merchant as described in U.S. patent application Ser. No. 14/041,890, which is herein incorporated by reference in its entirety. Yet further embodiments may provide merchants with techniques to identify potential customers and other customer relationship management functionality as described in U.S. patent application Ser. No. 13/803,445, which is herein incorporated by reference in its entirety.

As a particular example of the services and information offered by the merchant intelligence platform, embodiments may provide for analysis of market conditions and generation of a demand model to assist merchants with evaluating the demand for particular products or services offered by the merchant. For example, embodiments may advise merchants as to whether offering a particular product or service will be likely to result in increased profits. Additional embodiments may indicate to merchants whether sufficient demand exists to open a new storefront, and an optimal location at which to open said storefront. Yet further embodiments may provide location-based demand data (e.g., routing information for a food truck or a walking path for a traveling salesman) to assist the merchant with selling their wares. In some embodiments, the market conditions and demand model may be related to particular promotions or types of promotions offered by the merchant via a promotion and marketing service. For example, the merchant may be provided with detailed information including expected demand, expected return on investment, and the like, related to promotions available to be offered by the merchant through the promotion and marketing service.

As another particular example of the services and information offered by the merchant intelligence platform, embodiments may provide for configuration of one or more merchant local marketing devices. Merchant local marketing devices may provide the ability for merchants to provide data to consumers using electronic devices disposed at a particular location (e.g., a display or beacon at the merchant's storefront, on an electronic billboard owned or leased by the merchant, or the like) to provide information in the physical area around the merchant local marketing device. For example, the merchant intelligence platform may be operable to program a display or beacon with information relating to the products or services offered by the merchant.

As yet another particular example of the services and information offered by the merchant intelligence platform, embodiments may provide for the ability to manage market research tests for the merchant in an automated way. In particular, embodiments may assist the merchant with establishing market analysis tests by suggesting or selecting test parameters and otherwise managing an experimental process (e.g., selecting controls, variables, and measured outcomes for A/B tests). Embodiments may assist with the selection of parameters to be tested (e.g., selection of the product, service, or other condition to be analyzed), management of the data gathering process (e.g., ensuring the sample size is statistically significant), capturing of the data (e.g., managing a customer survey and tracking the relationship of the test parameters to the survey results), analyzing the data (e.g., identifying correlations between the captured data and the parameters being tested), and providing the results of the analysis to the merchant.

As a yet further particular example of the services and information offered by the merchant intelligence platform, embodiments may allow for the automated approval and compensation of merchants for new promotions offered by the promotion and marketing service. In this manner, the merchant intelligence platform may ensure that compensation is paid to the merchant upon receiving a request to initiate a new promotion offered for the merchant via the promotion and marketing service, prior to the actual sale of any promotions to consumers. The merchant intelligence platform may determine whether to provide compensation in this manner based on analysis of various forms of electronic marketing information associated with the merchant. In this manner, merchants with qualifying promotions may receive compensation immediately upon listing a promotion, without having to wait for consumers to purchase or redeem the promotion.

As yet another particular example of the services and information offered by the merchant intelligence platform, embodiments may allow the merchant to provide various triggers and configuration options to control whether, when, and how promotions are provided on the merchant's behalf by the promotion and marketing service. For example, rather than requesting a particular promotion with defined parameters, the merchant may define a desired outcome (e.g., bring in 5 new customers, fill my empty tables, generate at least $500 in revenue), and the merchant intelligence platform may select a promotion or set of promotions likely to provide the desired outcome. In some embodiments, the merchant may configure the merchant intelligence platform to automatically provide such services. In this regard, the merchant intelligence platform may allow the merchant to set up triggers that cause the promotion and marketing service to offer a particular promotion. For example, the merchant may configure the merchant intelligence platform to generate a particular promotion or a promotion having a particular desired outcome in response to a particular criteria (e.g., if it is Saturday evening and the business has not generated at least $2,000 in revenue for the day or at least a certain number of tables are empty, run a new promotion to bring in more customers).

It should be readily appreciated that the merchant intelligence platform may be configured in various additional and alternative manners to provide information and decision-making support to merchants based on a variety of input data sources other than the specific examples described herein. These input data sources may include, but are not necessarily limited to, electronic marketing information as described herein.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling or resulting in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the term "merchant local marketing device" refers to a device or devices used to electronically provide, transmit, broadcast, or display information to a consumer in proximity to the merchant local marketing device. For example, the merchant local marketing device may be so-called "beacons" or "ibeacons" configured to provide product information, location information, hours of operation, or any other information provided in a local area and associated with a particular merchant or a product or service offered by the particular merchant. "Merchant local marketing devices" may also include other electronic devices, such as display screens, televisions, tablet computers, audio playback devices, or the like.

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing communications provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to a trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although electronic marketing information provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, machine communication and processor resources. The inventors have identified that the wealth of electronic marketing information available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

Embodiments of a promotion and marketing service may function as a clearinghouse for a wide variety of electronic marketing information as described above. However, the inventors have identified that electronic marketing information as provided by the promotion and marketing service is often not useful to merchants in a raw form. Although some merchants may derive some value in knowing, for example, how many impressions were generated for a particular promotion, how many promotions were redeemed, or how much revenue was derived from those promotions, most merchants are not equipped to utilize this data in a meaningful way. In order to provide meaningful data to the merchant, the inventors have determined that the promotion and marketing service would need to provide a comprehensive stream of output data in addition to proper documentation to allow the merchant to author purpose-built applications to interpret the data. The inventors have determined that such a solution may not be feasible for a variety of reasons, both technical (e.g., management of proprietary data formats, privacy settings and other data access limitations) and administrative (e.g., costs in hiring an application developer to write an application to process the data).

In response to these problems and other problems, the inventors have identified methods and apparatuses for providing a merchant intelligence platform via a promotion and marketing service. In this manner, example embodiments of the present invention serve to provide merchants with a variety of useful information based on electronic marketing information provided to the promotion and marketing service, thus improving the quality of information provided to merchants, facilitating improved communications, marketing operations, and decision-making by the merchant.

In particular, embodiments of the present invention serve to address technical problems identified by the inventors in the art, including problems relating to management and analysis of a variety of disparate sources of electronic marketing information. Embodiments provide for improvements in the manner in which electronic marketing information is transformed into business analytic data, and improvements to the accuracy and usability of the generated business analytic data.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). The promotion and marketing service 102 may function to provide a merchant intelligence platform as described herein and below. Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, electronic marketing information, analytics, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant local marketing device, a merchant e-commerce server, a merchant inventory system, or a computing device accessing a web site designed to provide merchant access (e.g., by accessing a web page via a browser using a set of merchant account credentials). The merchant devices 110A-110N may also be mobile devices as described above with respect to the consumer devices 108A-108N.

Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic information among one or more consumer devices, merchant devices, and the promotion and marketing service is described below with respect to FIG. 3.

Example Apparatuses for Implementing Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, promotion management circuitry 210, analytics circuitry 212, and merchant intelligence management circuitry 214. The apparatus 200 may be configured to execute the operations described above with respect to FIG. 1 and below with respect to FIGS. 4-11. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or coprocessor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The promotion management circuitry 210 includes hardware configured to generate, provide, and manage promotions offered by a promotion and marketing service. The promotion management circuitry 210 may be configured to receive a request from a merchant to generate a new promotion and, in response to the request, facilitate the offering of the new promotion via the promotion and marketing service. In some embodiments, the promotion management circuitry 210 may be further configured to programmatically and/or automatically provide, offer, or generate promotions in response to the occurrence of a criterion or criteria. For example, a merchant may define a particular set of criteria that cause the promotion management circuitry 210 to offer a particular promotion or promotions. The promotion management circuitry 210 may manage promotions stored in a memory, such as the memory 204, and store promotions in the memory in response to the promotion being newly generated. In some embodiments, the promotion management circuitry 210 may dynamically control the offering parameters for a promotion or promotions in response to the occurrence of the set of criteria. The promotion management circuitry 210 may utilize processing circuitry, such as the processor 202, to perform these actions. The promotion management circuitry 210 may receive the request and/or otherwise communicate with a merchant device via a network interface provided by the communications circuitry 208. However, it should also be appreciated that, in some embodiments, the promotion management circuitry 210 may include a separate processor, specially configured field programmable gate array (FPGA), or application specific interface circuit (ASIC) to manage the offering of promotions via a promotion and marketing service. The promotion management circuitry 210 is therefore implemented using hardware components of the apparatus configured by either hardware or software for implementing these planned functions.

The analytics circuitry 212 includes hardware configured to manage, store, process, and analyze electronic marketing information and to generate and store business analytic information based on analysis of the electronic marketing information. The analytics circuitry 212 may be configured to receive electronic marketing information via various sources, such as through a network interface provided by the communications circuitry 208, and to analyze the electronic marketing information to generate the business analytic information using processing circuitry, such as the processor 202. The analytics circuitry 212 may be configured to generate a variety of data for use in support of a market intelligence platform. Although the processor 202 may be employed to perform analysis of the electronic marketing information to generate business analytic data, it should also be appreciated that, in some embodiments, the analytics circuitry 212 may include a separate processor, specially configured field programmable gate array (FPGA), or application specific interface circuit (ASIC) to manage generation of the business analytics data. The electronic marketing information analyzed by the analytics circuitry 212 and the business analytics information generated by the analytics circuitry 212 may be stored and/or accessed from a memory, such as the memory 204. The analytics circuitry 212 is therefore implemented using hardware components of the apparatus configured by either hardware or software for implementing these planned functions.

The merchant intelligence management circuitry 214 includes hardware configured to manage interaction between the apparatus 200 and a merchant device. To this end, the merchant intelligence management circuitry 214 may include hardware configured to provide a portal for receiving inquiries from merchants and providing business analytic data to merchants. The merchant intelligence management circuitry 214 may be configured to receive electronic marketing information and/or inquiries from merchants and provide responses (e.g., business analytic data) to inquiries via the communications circuitry 208. For example, the merchant intelligence management circuitry 214 may be configured to provide a web page portal to provide the business analytic data, responses to application programming interface (API) function calls made by a merchant device, or via any other method of communicating with a merchant device. The merchant intelligence management circuitry 214 may therefore function to enable execution of one or more applications that function to provide a merchant intelligence platform in conjunction with one or more components of the apparatus 200, such as the merchant intelligence management circuitry 214.

Although the processor 202 may be employed to provide an interface to a merchant intelligence platform by a merchant device, it should also be appreciated that, in some embodiments, the merchant intelligence management circuitry 214 may include a separate processor, specially configured field programmable gate array (FPGA), or application specific interface circuit (ASIC) to manage access to business analytics data via a merchant intelligence portal. The business analytics data may be stored in a memory, such as the memory 204 and accessed by the merchant intelligence management circuitry 214. The merchant intelligence management circuitry 214 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by example displays described herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

The merchant device(s) 110 may be embodied by one or more computing systems, such as apparatus 300 shown in FIG. 3. As illustrated in FIG. 3, the apparatus 300 may include a processor 302, a memory 304, input/output circuitry 306, communications circuitry 308, and merchant intelligence platform interface circuitry 310. The apparatus 300 may be configured to execute the operations described below with respect to FIGS. 1 and 3-4. The functioning of the processor 302, the memory 304, the input/output circuitry 306, and the communications circuitry 308 may be similar to the similarly named components described above with respect to FIG. 2. For the sake of brevity, additional description of these components is omitted.

The merchant intelligence platform interface circuitry 310 includes hardware configured to allow a merchant device to interact with a merchant intelligence platform. The merchant intelligence platform interface circuitry 310 may facilitate network communications with a server hosting a merchant intelligence platform. The merchant intelligence platform interface circuitry 310 may further provide a user interface for interacting with the merchant intelligence platform. For example, the merchant intelligence platform interface circuitry 310 may facilitate execution of an application or "app" that allows the merchant to access business analytic data provided by the merchant intelligence platform, to configure the merchant's interactions with the merchant intelligence portal, to request a particular set of business analytic data, or the like. To this end, the merchant intelligence platform interface circuitry 310 may include hardware configured to access the merchant intelligence platform, such as a network interface to send and receive data to and from the merchant intelligence platform, one or more user input devices for providing command inputs to an interface, and one or more display devices for displaying business analytic data or other results of the interactions between the merchant device and the merchant intelligence platform.

Although the processor 302 may be employed to facilitate interactions between the apparatus 300 and a merchant intelligence platform, it should also be appreciated that, in some embodiments, the merchant intelligence platform interface circuitry 310 may include a separate processor, specially configured field programmable gate array (FPGA), or application specific interface circuit (ASIC) to manage interactions with a merchant intelligence platform by a merchant device. The merchant intelligence platform interface circuitry 310 is therefore implemented using hardware components of the apparatus configured by either hardware or software for implementing these planned functions.

Example Electronic Marketing Information Service Data Flow

FIG. 4 depicts an example data flow 400 illustrating interactions between a server 402, one or more consumer devices 404, and one or more merchant devices 406. The server 402 may be implemented in the same or a similar fashion as the server 104 as described above with respect to FIG. 1 and/or the apparatus 200 described above with respect to FIG. 2, the one or more consumer devices 404 may be implemented in the same or a similar fashion as the consumer devices 108A-108N as described above with respect to FIG. 1, and the one or more merchant devices 406 may be implemented in the same or a similar fashion as the merchant devices 110A-110N as described above with respect to FIG. 1, and/or the apparatus 300 as described above with respect to FIG. 3.

The data flow 400 illustrates how electronic information may be passed among various systems when employing a server 402 in accordance with embodiments of the present invention. The one or more consumer devices 404 and/or one or more merchant devices 406 may provide a variety of electronic marketing information to the server 402 for use in providing promotion and marketing services to the consumer. This electronic marketing information may include, but is not limited to, location data, clickstream data, transaction data, communication channel data, intelligence platform configuration data, and/or discretionary data.

As a result of transactions performed between the one or more consumer devices 404 and the server 402, the server 402 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 404 offered by the server 402, the server 402 may leverage information provided by the consumer devices to improve the relevancy of marketing communications to individual consumers or groups of consumers. In this manner, the server 402 may determine promotions, goods, and services that are more likely to be of interest to a particular consumer or group of consumers based on clickstream data, location data, and other information provided by and/or relating to particular consumers. For example, the server 402 may detect the location of a consumer based on location data provided by the consumer device, and offer promotions based on the proximity of the consumer to the merchant associated with those promotions.

Alternatively, the server 402 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 402 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 402 may also control other factors of the electronic marketing communications sent to the consumer other than the particular promotions included in the electronic marketing communication. For example, the server 402 may determine the form, structure, frequency, and type of the electronic marketing communication. As with the content of the electronic marketing communication, these factors may be programmatically determined according to various methods, factors, and processes based on electronic data received by the server 402 for the purpose of maximize the likelihood that the communication will be relevant to the recipient consumer.

The server 402 interactions with the one or more merchant devices 406 may be related to enabling the merchant to market their products using a promotion and marketing service. For example, the one or more merchant devices 406 may provide promotion data defining one or more promotions to be offered by the promotion and marketing service on behalf of the merchant. The server 402 may receive this information and generate information for providing such promotions via an e-commerce interface, making the promotions available for purchase by consumers. The server 402 may also receive information about products from the one or more merchant devices 406. For example, a merchant may provide electronic marketing information indicating particular products, product prices, inventory levels, and the like to be marketed via a promotion and marketing service. The server 402 may receive this information and generate listing information to offer the indicating products to consumers via a promotion and marketing service.

The one or more merchant devices 406 may also receive information from the server 402. For example, in some embodiments a merchant may obtain access to certain business analytic data aggregated, generated, or maintained by the server 402. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing information offered via the promotion and marketing service based on a subscription model.

The interactions between the server 402 and the merchant devices 406 may also include providing the merchant devices 406 with access to a merchant intelligence platform. As described above, the server 402 may leverage access to the wide variety of electronic marketing information provided by the merchant devices, client devices, and other sources to perform analyses and improve the quality and utility of business analytic data made available to merchants. In this regard, the server 402 may provide for various analysis, processing, and decision-making functions including, but not limited to, market demand modeling, programmatic configuration of merchant local marketing devices, programmatic management of marketing tests, management of automatic compensation functionality, and programmatic assistance of the merchant with promotion management functions. The interactions between the merchant devices 406 and the merchant intelligence platform may be controlled or configured by intelligence platform configuration data provided to the server 402. Such data represents electronic information that alters or configures the interactions between the merchant devices 406 and a merchant intelligence platform. Detailed examples of data flow and operations performed as a result of interactions between merchant devices and a merchant intelligence platform are described further below with respects to FIGS. 5-11.

The one or more merchant devices 406 may also receive electronic compensation data from the server 402. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Embodiments advantageously provide for improvements to the server 402 and merchant devices 406 by improving the quality and variety of interactions offered between the merchant device and a merchant intelligence platform offered by the server 402. In this manner, embodiments offer improvements to the electronic marketing and electronic business intelligence services offered by the server 402, resulting in an improvement to the accuracy and quality of data. These improvements further have the effect of reducing the amount of direct user interface interaction needed by the merchant to access meaningful data. Furthermore, by providing more accurate data, the merchant can gain the same benefit with less system interaction, thus conserving system resources and improving the technical functionality of the merchant device 406 and the server 402.

Example Interactions Among a Merchant
Intelligence Platform and Various Merchant
Devices FIG. 5 illustrates an example data flow interaction between a merchant intelligence platform and various merchant devices in accordance with some example embodiments of the present invention. As noted above, a merchant intelligence platform may interact with different merchant devices in different manners. The data flow 500 illustrates how a merchant intelligence platform 504 may, as a component of a promotion and marketing service 502, communicate with one or more of a merchant point of sale 506, a merchant inventory system 508, a merchant computing device 510, and/or a merchant local marketing device 512. As noted above, the merchant intelligence platform 504 may, in some embodiments, directly configure, instruct, or otherwise interact with one or more of these merchant devices 506-512.

The merchant intelligence platform 504 may be provided by a server such as described above with respect to FIGS. 1, 2, and 4. As noted above, the merchant intelligence platform 504 may be provided by one or more components and/or specially configured circuitry. For example, merchant intelligence management circuitry 214 as described above with respect to FIG. 2 may function to provide for execution and hosting of the merchant intelligence platform 504. Data utilized by the merchant intelligence platform 504 may be received and processed by analytics circuitry 212 as described above with respect to FIG. 2. The merchant intelligence platform 504 may further interface with promotion management circuitry 210 to assist with the generation, management, and monitoring of promotions offered by a promotion and marketing service as described above with respect to FIG. 2.

The merchant intelligence platform 504 may communicate with a merchant point-of-sale 506. The merchant point-of-sale 506 may provide the merchant intelligence platform 504 with information relating to transactions performed at the point-of-sale 506. The merchant point-of-sale 506 may include any computing device with hardware operable to complete a transaction for a good or service between a consumer and a merchant. The merchant point-of-sale 506 may include various means for accepting payment information and notifying of the merchant intelligence platform 504 that a transaction has occurred. For example, the merchant point-of-sale 504 may include a cash drawer, barcode scanner, magnetic strip reader, radio frequency identifier (RFID) reader, near field communication (NFC) reader, receipt printer, network interface, or any other hardware usable to complete a transaction. It should be appreciated that the point-of-sale 506 may be any computing device configured to perform a transaction by receiving and processing payment from the consumer. For example, the merchant point-of-sale 506 may be a cash register at a merchant retail location, a tablet computer configured with a magnetic strip reader and software for operating the magnetic strip reader, an e-commerce application executing on a web server configured to accept credit card transaction data, or the like.

The merchant point-of-sale 506 may operate to transmit transaction data relating to transactions performed on the merchant point-of-sale 506 to the merchant intelligence platform 504. For example, the merchant point-of-sale 506 may include a network interface that transmits electronic data related to the price, type, and quantity of items purchased using the merchant point-of-sale 506. The merchant point-of-sale 506 may also be operable to capture and transmit consumer information to the merchant intelligence platform 504, such consumer information may include the consumer's name, billing information, a consumer loyalty card number, or the like.

The merchant point-of-sale 506 may also receive information from the merchant intelligence platform 504. As described above, embodiments may provide for the automatic configuration and dynamic adjustment of certain aspects of the merchant's business based on recommendations and other business analytics data generated by the merchant intelligence platform 504. For example, the merchant intelligence platform 504 may transmit instructions to the merchant point-of-sale 504 to alter the products or services offered by the merchant (e.g., changing a price of a product, offering a new product bundle, enabling the use of a new promotion, or the like).

In some embodiments, the merchant point-of-sale 506 may communicate with the merchant intelligence platform 504 through the use of API functions offered by the merchant intelligence platform 504. For example, whenever a transaction is completed by the merchant point-of-sale 506, the merchant point-of-sale 506 may notify the merchant intelligence platform 504 through a call to a "transaction complete" API function. It should be appreciated that, in some embodiments, transaction data may also be received from the merchant point-of-sale 506 in other manners. In some embodiments such data may be provided via an add-on device or reader configured to attach or otherwise interface with the merchant point-of-sale 506. For example, in some embodiments a scanner device may be configured to fit over a receipt feed of a register such that receipts are scanned by the scanner device as they are printed. The scanner device may gather transaction data from the scanned receipts and transmit said scanned transaction data to the merchant intelligence platform. Additionally, some embodiments may employ other devices to gather data (e.g., a universal serial bus (USB) device inserted into a port on a merchant point-of-sale system). In this manner, embodiments allow for gathering of transaction data even from merchant point-of-sale systems that might not be originally configured with a network interface or removable storage for gathering and transmitting such transaction data.

The merchant intelligence platform 504 may also communicate with a merchant inventory system 508. The merchant inventory system 508 may operate to electronically track the availability of products and items necessary to provide any services offered by the merchant. As inventory levels change (e.g., as products and supplies are sold/used and reordered) the merchant inventory system 508 may notify the merchant intelligence platform 504. The merchant inventory system 508 may provide information to the merchant intelligence platform 504 relating to various logistical processes. For example, the merchant inventory system 508 may notify the merchant intelligence platform 504 when products are sold, reordered, and delivered.

As described above with respect to the merchant point-of-sale 506, the merchant inventory system 508 may also be configured to receive information from the merchant intelligence platform 504. In this manner, the merchant inventory system 508 may be operable to receive instructions relating to the management of inventory levels and reordering of inventory from the merchant intelligence platform 504. For example, the merchant intelligence platform 504 may instruct the merchant inventory system 508 to order additional products or supplies based on an expected increase in demand for a particular product or service.

As described above with respect to the merchant point-of-sale 506, communications between the merchant inventory system 508 and the merchant intelligence platform 504 may occur via an API (e.g., with the merchant inventory system 508 executing API function calls to indicate that certain inventory management operations have been performed).

The merchant intelligence platform 504 may also communicate with a merchant computing device 510. The merchant computing device 510 may be any computing device as known in the art and capable of receiving business analytic data generated by the merchant intelligence platform 504. For example, the merchant computing device 510 may be implemented as a desktop, laptop, server, or other computing device as described above with respect to FIG. 4. In some embodiments, the merchant computing device 510 is a device configured with one or more applications for facilitating business operations of the merchant. For example, the merchant intelligence platform 504 may have an associated client that executes on the merchant computing device 510 to enable the merchant computing device 510 to interface with the merchant intelligence platform 504. Additionally or alternatively, the merchant computing device 510 may also include applications related to billing, accounting, or bookkeeping functionality, human resources applications (e.g., employee scheduling and payroll functionality), productivity applications (e.g., word processors or spreadsheet applications), file system applications (e.g., file sharing and document management applications), or any other application suitable for advancing the goals of the merchant's business operations. It should be appreciated that any or all of these various applications may include an interface to send and receive information to and from the merchant intelligence platform 504.

In some embodiments, the merchant computing device 510 interacts with the merchant intelligence platform 504 via a web interface, such as an interface provided by a web browser application executing on the merchant computing device 510. For example, the merchant intelligence platform 504 may provide a "dashboard" interface for viewing business analytic data. In some embodiments, this dashboard may provide information regarding various performance metrics for the merchant. These performance metrics may include the relative performance, profit, and/or return on investment for various characteristics of the merchant's business (e.g., promotions offered, marketing campaigns, profit and performance breakdowns for individual products or services, and the like). In some embodiments, the performance metrics may also be shown in relation to other merchants. For example, the performance metrics may indicate the relative performance of certain aspects of the merchant's business compared to other merchants of a similar size, similar type, similar location, or the like.

The merchant intelligence platform 504 may also communicate with one or more merchant local marketing devices 512. As described above, the merchant local marketing devices 512 may be any device operable to provide information relating to the merchant to consumers in a particular location. For example, the merchant intelligence platform 504 may determine content for beacons present at the merchant's store front and content for display devices managed or maintained by the merchant. For example, in some embodiments the merchant may provide a list of goods and services via a merchant local marketing device (e.g., a restaurant menu displayed on a tablet computer or video display). Embodiments of the merchant intelligence platform 504 may dynamically alter this content based on business analytic data derived by the merchant intelligence platform 504 and/or provided by the merchant intelligence platform to the merchant. For example, the merchant intelligence platform 504 may remove an item from the list of goods or services indicated via the merchant local marketing device 512 in response to a determination that the item is reducing the profitability of the merchant. As a particular example, the merchant intelligence platform 504 may determine that a particular restaurant menu item is infrequently ordered and has a high carrying cost of ingredients. As a result, the merchant intelligence platform 504 may dynamically alter menus offered by merchant local marketing devices 512 to remove the particular menu item from display or broadcast.

The merchant intelligence platform 504 may also be configured to receive information provided by the merchant local marketing device 512. For example, the merchant intelligence platform 504 may receive information from the merchant local marketing device 512 indicating impressions caused by the merchant local marketing device 512 (e.g., every time the merchant local marketing device 512 sends its content to a consumer). Such impressions may be provided to the merchant intelligence platform 504 as electronic marketing information (e.g., clickstream data). In some embodiments, the merchant local marketing device 512 may obtain information about the consumer to which the content was provided, such as by querying a consumer device used to obtain the information. For example, the merchant local marketing device 512 may associate the impression with a particular consumer account by examining a cookie or other unique identifier provided by the consumer device, by querying an application executing on the consumer device (e.g., an application provided by the promotion and marketing service to receive content from merchant local marketing devices), or the like. In some embodiments, content provided to a particular consumer device may be altered or tailored to that consumer device based on the electronic marketing information received from the merchant local marketing device 512.

Example Process for Providing Business Analytic Data Via a Merchant Intelligence Platform Turning now to FIG. 6, example operations for providing business analytic data are illustrated from the perspective of a promotion and marketing service that incorporates a merchant intelligence platform. The operations illustrated in FIG. 6 may, for example, be performed by elements of the promotion and marketing service 102 (e.g., server 104) described with respect to FIG. 1, with the assistance of, and/or under the control of one or more devices, such as apparatus 200. In particular, embodiments of a process 600 may be performed by merchant intelligence management circuitry 214 as described above with respect to FIG. 2.

FIG. 6 depicts a process 600 that may be employed to generate business analytics data based on received electronic marketing information, and provide intelligence, analysis, and decision-making support to merchants using the business analytics data. It should be readily appreciated that embodiments of the present invention may be employed to provide support and other services to merchants in a variety of manners. For example, as described above, embodiments may function to gather data and provide business analytic data in response to inquiries received from merchants.

In the context of the present application, the term "inquiries" as used with respect to "merchant inquiries" should be understood broadly to refer to any interaction between the merchant and the market intelligence platform that results in a change in the behavior of either the merchant or market intelligence platform in relation to one another. In some embodiments the "inquiry" may be a request for a specific report, reports, or set of data as derived by the merchant intelligence platform from electronic marketing information. For example, the merchant may request an analysis of demand in a target market where the merchant is considering an expansion, and the merchant intelligence platform may generate a report relating to the viability of a new location in the target market based on known demographics and other electronic marketing information relating to the target market. In some embodiments, the inquiry provided by the merchant may be a configuration change, constraint, or other adjustment to the behavior of the merchant intelligence platform with respect to the merchant. For example, the merchant may specify a set of rules that result in dynamic generation of promotions based on electronic marketing information (e.g., the merchant may request the market intelligence platform initiate a new promotion if the merchant has not had at least a certain number of customers by a certain time of day). In yet further embodiments, the inquiry provided by the merchant may be a request for the market intelligence platform to take a particular action. For example, the merchant may request that the market intelligence platform initiate a market research study of a particular characteristic of the merchant's business. The process 600 broadly describes how the merchant intelligence platform may receive and respond to these inquiries. Further examples of particular types of inquiries and associated processing are described below with respect to FIGS. 7-11.

At action 602, the market intelligence platform generates business analytic data based on received electronic marketing information. The generation of business analytic information may be performed constantly, such that the data is immediately ready in response to a received inquiry. Alternatively, in some embodiments the analysis of the electronic marketing information and derivation of the business analytic data may be performed in response to a particular inquiry submitted by the merchant. As such, it should be appreciated that the derivation of business analytic data may occur both before, after, or in response to an inquiry received by the market intelligence platform. It should also be appreciated that the electronic marketing information that is analysed is not necessarily associated with a particular merchant. For example, embodiments of the market intelligence platform may analyze data from many merchants across a given market when generating business analytics, even if the business analytics are provided in response to a particular merchant inquiry. Some embodiments may allow merchants to "opt out" of having their associated electronic marketing information accessed in this manner, though in some embodiments participation in data aggregation and the analytics process may be a pre-condition for allowing merchants to utilize the market intelligence platform or other functions of a promotion and marketing service. The business analytics data may be derived from the electronic marketing information by various means, such as the analytics module 212 described above with respect to FIG. 1. In some embodiments, the business analytics data may be derived from the electronic marketing information in response to a request or instruction from means for managing a merchant intelligence framework, such as the merchant intelligence management module 214 described above with respect to FIG. 1.

At action 604, a merchant inquiry is received via a merchant intelligence platform. The inquiry may be received from a merchant device, such as over a network interface. As noted above, the inquiry may contain a request for specific data from the merchant intelligence platform, a request to take a particular action, or an adjustment to configuration parameters defining interactions between merchant devices and the merchant intelligence platform. The merchant inquiry may be received via means for communicating over a network, such as the communications circuitry 208 described above with respect to FIG. 1. In some embodiments, the inquiry is received from the communications circuitry and processed by means for processing the inquiry, such as provided by the merchant intelligence management circuitry 214 described above with respect to FIG. 1.

At action 606, business analytics data is provided to the merchant in response to the inquiry. As noted above, the business analytic data broadly refers to data generated through the analysis of electronic marketing information that is provided to merchants to assist with the business operations of the merchant. In this regard, the business analytics data may include reports, graphs, data models, statistics, content (e.g., data to be broadcast via a merchant local marketing device), promotions (e.g., promotions dynamically generated based on statistical analysis of the electronic marketing information), location data (e.g., routing or pathing information), configuration changes to merchant devices (e.g., dynamic updates to merchant point-of-sale devices, merchant local marketing devices, merchant inventory systems, or the like), or any other data provided to the merchant for the purpose of improving their business. Specific example processes for providing this business analytics data will now be described in further detail with respect to FIGS. 7-11.

Example Process for Providing Merchant Local Marketing Device Data Via Merchant Intelligence Platform As noted above, one use of the merchant intelligence platform is to provide dynamic control of data distributed by one or more merchant local marketing devices. As wireless communication techniques have become ubiquitous, more and more devices are capable of communicating with one another. New communication channels provide new opportunities for merchants to engage with consumers. In particular, so-called "beacon" devices provide the ability for merchants to locally broadcast a variety of different information to consumers, including product information, listings of goods and services (e.g., menus), merchant retail information (e.g., store hours), location data (e.g., positioning data to assist with indoor navigation processes), customer service management data (e.g., the consumer's position in a customer service queue), and the like. Even aside from the use of beacon devices, merchants may also have displays, speakers, and other electronic devices capable of receiving content from a remote source. Embodiments of the present invention may leverage the ability of a merchant intelligence platform to dynamically determine electronic content for these merchant local marketing devices in an improved manner.

Turning now to FIG. 7, example operations for providing merchant local marketing device data are described from the perspective of a promotion and marketing service that incorporates a merchant intelligence platform. The operations illustrated in FIG. 7 may, for example, be performed by elements of the promotion and marketing service 102 (e.g., server 104) described with respect to FIG. 1, with the assistance of, and/or under the control of one or more devices, such as apparatus 200. In particular, embodiments of a process 700 may be performed by merchant intelligence management circuitry 214 as described above with respect to FIG. 2.

At action 702, an inquiry relating to merchant local marketing device data is received. In the present context, the term "merchant local marketing device data" is used to describe data that is provided to a merchant local marketing device to control operations of the merchant local marketing device. This data may include content (e.g., what should the merchant local marketing device broadcast, display, or transmit?) or other configuration settings (e.g., instructions to enable the merchant local marketing device, disable the merchant local marketing device, adjust the range of the merchant local marketing device, or the like). The inquiry may be a direct inquiry, whereby the merchant specifically requests content to be pushed to the merchant local marketing device, a periodic inquiry, whereby the content is periodically evaluated and updated, or an event-based inquiry, whereby the content is updated in response to a particular event (e.g., an occurrence of a particular condition or criteria being met based on analysis of electronic marketing information or business analytic data accessible to the merchant intelligence platform). The inquiry may include certain parameters, such as for which merchant local devices the merchant local device data is requested, the type of data requested, constraints on the data requested, and the like.

The inquiry may be received via means for communicating over a network, such as the communications circuitry 208 described above with respect to FIG. 2. In some embodiments, the inquiry is received from the communications circuitry and processed by means for processing the inquiry, such as provided by the merchant intelligence management circuitry 214 described above with respect to FIG. 2.

At action 704, the format and content of the merchant local marketing device data are determined. The format of the merchant local marketing device data may be determined based on the type of the merchant local marketing device. For example, content for display on a video display would need to be formatted differently from content for output through a speaker, which would also in turn be formatted differently from content broadcast via a beacon. Content for the merchant local marketing device data may be determined by the merchant intelligence platform in conjunction with received analytics data and constraints, configuration settings, or other data provided by the merchant. In some embodiments, the content for the merchant local marketing device data further affects the formatting of the merchant local marketing device data. For example, if the content includes information about a particular promotion, the promotion may be provided according to a particularly defined structure. Upon determining that the content includes such a promotion, embodiments may alter the format of the merchant local marketing device data to take into account a particular structure defined for a promotion. For example, a promotion may be defined according to a particular set of markup language tags broadcast via a beacon, and, upon being received via an appropriately configured device (e.g., a consumer smart phone), a consumer receiving the promotion may be prompted to purchase the promotion via an application (e.g., an "app" associated with the same promotion and marketing service offering the merchant intelligence platform). The format and content for the merchant local marketing device data may be determined by means for determining the format and/or the content of the merchant local marketing device, such as the merchant intelligence management circuitry 214 described with respect to FIG. 2.

In some embodiments, the merchant local marketing device may be configured to alter, constrain, or otherwise evaluate the content of the merchant local device data before it is transmitted for viewing by a consumer. For example, in some embodiments a consumer device may indicate that the user has a particular constraint or parameter that affects how the merchant local marketing device data should be displayed.

As an example, a consumer may be a vegetarian, and thus non-vegetarian items on a restaurant menu broadcast by the merchant local marketing device may not be of interest to the consumer. The consumer may indicate to the merchant local marketing device that the consumer is a vegetarian (e.g., as a result of analysis of electronic marketing information associated with the consumer, such as discretionary data provided in association with the consumer's account on a promotion and marketing service), and the merchant local marketing device may remove non-vegetarian meal options from data provided to the consumer device. In some embodiments, such constraints and configuration options are defined for the merchant local marketing devices by the merchant intelligence platform, such as in response to the merchant inquiry or based on business analytics data.

Alternately, in some embodiments constraint on the merchant local marketing device data may be performed on the consumer device. For example, if the consumer has indicated they are a vegetarian and the merchant local device data is a restaurant menu, the consumer device may remove non-vegetarian meal options from the menu. In some embodiments, the format of the merchant local marketing device data may define a particular taxonomy for describing products, services, and/or promotions which specifies categories, sub-categories, and other relationships between the particular products, services, and/or promotions.

At action 706, embodiments of the process 700 provide the merchant local marketing device data to the merchant local marketing device. The merchant local marketing device data may then control the operation of the merchant local marketing device. The merchant local marketing device data may be provided to the merchant local marketing device via means for providing the merchant local marketing device data, such as the communications circuitry 208 described above with respect to FIG. 2. In some embodiments, provision of the merchant local marketing device data is controlled by the merchant intelligence management circuitry 214 and routed through the communications circuitry 208 to the merchant local marketing device.

Example Process for Providing Business Analytics Data Based on a Demand Model Via a Merchant Intelligence Platform As noted above, another use of the merchant intelligence platform is to assist merchants as they make mission critical business decisions, such as deciding whether and how to order and reorder inventory, whether, when, and where to open new locations or otherwise expand their business, and deciding which products and services to offer and how much to charge for said products and services. To this end, embodiments of the merchant intelligence platform provide the ability to generate sophisticated demand models that can assist merchants with planning their business decisions. In this regard, embodiments may utilize electronic marketing information to generate demand models that reflect the demographics, preferences, and behaviour of consumers. These demand models may be provided to merchants to assist the merchants in making decisions.

Turning now to FIG. 8, example operations for addressing merchant inquiries related to a demand model are described from the perspective of a promotion and marketing service that incorporates a merchant intelligence platform. The operations illustrated in FIG. 8 may, for example, be performed by elements of the promotion and marketing service 102 (e.g., server 104) described with respect to FIG. 1, with the assistance of, and/or under the control of one or more devices, such as apparatus 200. In particular, embodiments of a process 800 may be performed by merchant intelligence management circuitry 214 acting in concert with analytics circuitry 212 as described above with respect to FIG. 2.

At action 802, a market demand model is generated based on electronic marketing information. The market demand model may reflect a variety of factors and signals related to a particular market, including but not limited to demand for particular products and services in a particular geographic area, demand for products or services from a particular population or demographic group, transaction data relating to particular products or services, responses to survey questions, and the like. In general, the factors relating to the demand model may be derived from electronic marketing information, though the data used to generate the demand model may also reflect other electronic data received from various other external systems. For example, embodiments may obtain electronic real estate listing information from a real estate listing server to be used to calculate expected rents and other overhead costs associated with expanding to a particular location. The electronic real estate listing information may include addresses, rents, and various property suitability indicators, including but not limited to the property square footage, utility hookups (e.g., availability of 240v outlets and sufficient water and sewer service), zoning restrictions, and the like. Property suitability indicators associated with prospective merchant locations may be known as "prospective property suitability indicators," and property suitability indicators required by a particular merchant or merchant type may be known as "required property suitability indicators."

The market demand model may be generated by means for generating a market demand model, such as analytics circuitry 212 as described above with respect to FIG. 2.

At action 804, an inquiry is received from a merchant relating to the demand model. It should be appreciated that a variety of inquiries may be related to the demand model. For example, the merchant may wish to know the optimal address at which to open a new location. The demand model may calculate a location or region where demand for the products or services offered by the merchant are likely to be at their highest, and suggest the location to the merchant. Additionally or alternatively, the merchant may inquire as to the expected demand for a particular product or service the merchant is considering offering. In response, the merchant intelligence platform may employ the demand model to determine the expected impact on the merchant's business from offering the new product or service based on demand for that particular product or service (or similar products or services). Processing of the merchant inquiry may be performed by various means, such as the merchant intelligence management circuitry 214 described above with respect to FIG. 2.

At action 806, a response to the merchant inquiry is provided. The response may be provided by providing the merchant with business analytics data related to the inquiry and derived from the demand model. It should be appreciated that the response may take various forms commensurate with the type and context of the inquiry. For example, the response may include an analysis of the costs and benefits of relocating or expanding to a particular location, the costs and benefits of offering a new product or service or removing a product or service offering, or an optimal route to obtain maximum customer engagement (e.g., a street route for a food truck). The response may be provided by various means, such as the merchant intelligence management circuitry 214 described above with respect to FIG. 2. In some embodiments, communications circuitry such as the communications circuitry 208 may be employed to transmit the results to a merchant device.

Embodiments may extend the functionality of the merchant intelligence platform in the context of demand prediction in various manners to provide for improved services to merchants. In some embodiments, the merchant intelligence platform may perform "business bootstrapping" functions such as assisting merchants with the process of opening a new business or expanding to a new location. To this end, embodiments may assist merchants with identifying demand for particular products or services, and availability of infrastructure to support a business that responds to the demand. For example, embodiments may identify real estate prices within a particular area, and compare overhead costs associated with the real estate with expected profits based on demand for a particular product or service to determine an overall return on investment for expansion to that particular area.

In some embodiments, the merchant intelligence platform may recommend a particular type of business, products, or services based on demand and available infrastructure in the area. For example, the merchant intelligence platform may determine that demand for an Italian restaurant is high in a particular area, and identify commercial properties for lease in the particular area that are capable of supporting an Italian restaurant based on known property suitability indicators required to operate an Italian restaurant.

In some embodiments, the merchant intelligence platform may assist merchants with the startup of a business in a new location. The merchant intelligence platform may offer business startup kits that provide contacts and/or orders for raw materials for the products and/or services to be offered for a particular business. In some embodiments, the merchant intelligence platform may assist a prospective business owner with obtaining a small business loan. For example, the initial amount of the loan may be tied to the expected costs for launching a new business at the location identified by the merchant intelligence platform. In some embodiments, the merchant intelligence platform may offer the loan itself, or offer some sort of underwriting or collateral for the loan based on the estimated demand at the particular location at which the business will open. For example, if the merchant intelligence platform calculates an extremely high demand for the product or service offered by the merchant at the prospective location, the merchant intelligence platform may offer to co-sign or underwrite some or all of a small business loan on the merchant's behalf.

The merchant intelligence platform may further assist the merchant with making various business decisions based on the demand model. For example, the merchant intelligence platform may suggest a marketing structure to the merchant, how to structure a list of services or menu of items, advising the merchant as to where and when to open or close a location, or the like.

In some embodiments, the merchant intelligence platform may also assist the merchant with initiating communication or performing transactions with suppliers or buyers. For example, the merchant intelligence platform may interact with other merchants who use the merchant intelligence platform and that sell goods or services needed by a first merchant to assist the first merchant with obtaining their supplies while also generating leads for the other merchants. In some embodiments, the merchant intelligence platform may assist merchants with obtaining discounts, such as by providing a platform whereby merchants can pool their supply purchases to obtain volume discounts (e.g., having 5 local pizzerias pool together to purchase flour from a flour merchant).

In some embodiments, the merchant intelligence platform can also offer other business analytic services, including but not limited to a reputation management platform (e.g., showing aggregated reviews for the merchant across review websites), providing polling and trend information, providing expected return-on-investment numbers (e.g., if the merchant's entire inventory of products or promotions was sold, what sort of return would they expect?), inventory and supply information (e.g., how many products the merchant has sold, how many products the merchant has remaining, and how many products is the merchant expected to use prior to the next shipment?), and the like.

In yet further embodiments, the merchant intelligence platform may offer business services to the merchant. For example, the merchant intelligence platform may offer web hosting, an e-commerce portal, point-of-sale and accounting services, or other services to the merchant. The merchant intelligence platform may utilize these services to gather electronic marketing information that is then used to improve the quality of the business analytic data provided to the merchant. The merchant intelligence platform and the merchant may thus both derive a benefit through the merchant's use of these business services, as the merchant is provided with free or inexpensive access to a suite of services they would otherwise likely have to purchase, and the merchant intelligence platform is provided with an additional source of electronic marketing information to be used for the benefit of both the merchant and the merchant intelligence platform.

Example Process for Providing Market Analysis Testing Via a Merchant Intelligence Platform As noted above, the merchant intelligence platform may also provide market analysis testing services for a merchant. The ability of the merchant intelligence platform to monitor incoming electronic marketing information and to manage provide decision making support to merchants provides the unique ability to determine the impact that changes to the merchant's business practices have on performance metrics such as expected profit, return on investment, customer satisfaction, and customer engagement. To this end, embodiments of the merchant intelligence platform are operable to receive a request from a merchant to initiate market analysis testing. Based on the testing requested by the merchant, the merchant intelligence platform may programmatically alter certain test parameters affecting the interaction between the merchant and consumers in order to obtain a statistically significant sample size from which correlations can be identified between the impact on the customer experience and the change in test parameters. For example, embodiments may function to programmatically add or remove menu items (e.g., via alteration of menu items displayed on a tablet computer) to determine how the addition or removal of menu items affects the items ordered by consumers. As another example, embodiments may programmatically alter the location at which consumers are seated, server assignments, ambient conditions (e.g., temperatures, lighting levels, and the like), or other factors having an influence on the merchant-consumer interaction.

Embodiments may further monitor consumer interactions with the merchant using a variety of signals. For example, the merchant intelligence platform may function to prompt consumers with survey questions in response to a variation in test parameters, or the merchant intelligence platform may monitor transaction data associated with consumers impacted by the changed test parameters. Data may also be gathered via a variety of sensors in communication with the merchant intelligence platform, including but not limited to video cameras, microphones, temperature sensors, and the like.

Embodiments of the merchant intelligence platform may also conduct market analysis tests in a passive manner, by noting correlations between test parameters that are not dynamically altered by the merchant intelligence platform. For example, the merchant intelligence platform may gather data related to a test parameter specified by the merchant through passive monitoring of electronic marketing information without affirmatively causing a change in test parameters.

Embodiments may also function to aggregate data or conduct market analysis tests from a variety of sources. For example, a given merchant may not be able to provide a sufficient amount of data to obtain a statistically significant sample size to estimate the impact of a change to a given set of test parameters. However, the merchant intelligence platform may provide the merchant with the ability to "opt in" to a test of a given set of parameters performed across a variety of merchants with the same or similar characteristics (e.g., testing the impact of a new topping across multiple pizza restaurants). In exchange for opting in to the test and agreeing to provide data and allow the merchant intelligence platform to alter the test parameters, merchants that opt in may be provided with the results of the test in order to improve their business decision making. In some embodiments, the merchant intelligence platform may identify merchants as possible test candidates based on the merchant being suitable for at least one test parameter (e.g., pizzerias would be suitable for testing the impact of a new pizza topping, but perhaps unsuitable for testing a new seafood recipe). The merchant intelligence platform may also select merchants based on other factors, such as location, desired sample size, past successful interactions with the merchant, or the like.

Turning now to FIG. 9, example operations for performing market analysis tests are described from the perspective of a promotion and marketing service that incorporates a merchant intelligence platform. The operations illustrated in FIG. 9 may, for example, be performed by elements of the promotion and marketing service 102 (e.g., server 104) described with respect to FIG. 1, with the assistance of, and/or under the control of one or more devices, such as apparatus 200. In particular, embodiments of a process 900 may be performed by merchant intelligence management circuitry 214 acting in concert with analytics circuitry 212 as described above with respect to FIG. 2.

At action 902, an inquiry is received for a market analysis test. As noted above, the request may be received from the merchant (e.g., the merchant indicates a particular test parameter they wish to study), or from internal to the promotion and marketing service. The inquiry may be received may be received via means for communicating over a network, such as the communications circuitry 208 described above with respect to FIG. 1. In some embodiments, the inquiry is received from the communications circuitry and processed by means for processing the inquiry, such as provided by the merchant intelligence management circuitry 214 described above with respect to FIG. 1.

At action 904, parameters for the market analysis test are determined. The test parameters may define the conditions that are intended to be studied by the market analysis test. For example, the test parameters may indicate that the merchant wishes to evaluate the impact on a change in seating arrangement, number of servers assigned to a seating area, frequency of server check-in with customers, addition or deletion of a menu item, or any other factor which may be varied and which may have an impact on the process by which merchants engage in commerce with consumers. The parameters may further define a type of test methodology. For example, the merchant may request that an "A/B" test is performed, whereby the particular parameter is randomly varied between a control and a treatment across two separate populations to attempt to identify correlations between the parameter and changes in the populations. Alternately, other types of tests with different variations may also be employed (e.g., varying a parameter across a range of values, varying according to particular demographics instead of randomly, or the like). In some embodiments, the merchant intelligence platform may automatically or dynamically select the type of test methodology based on factors such as the expected sample size, availability of other data sources (e.g., additional merchants wishing to study the same factors), range of possible values of the test parameters (e.g., if the test parameter only has two values, A/B testing may be preferable as compared to if the test parameter has a range of values), or the like. The parameters of the market analysis test may be determined by means for determining the parameters of the market analysis test, such as the merchant intelligence management circuitry 214 as described above with respect to FIG. 2.

At action 906, the test parameters are provided to the merchant to begin the test. As noted above, the test parameters may be programmatically altered according to the test methodology and used to generate data comprising configuration changes for merchant devices. These configuration changes may then be conveyed to the merchant devices in a manner such that the parameters of the test are automatically implemented by the merchant devices. For example, test parameters relating to information provided by merchant local marketing devices may result in automatic configuration of the merchant local marketing devices according to the test parameters, test parameters relating to consumer seat assignment logic may be automatically configure merchant capacity management and seating systems, and test parameters relating to addition of a menu item may be employed to automatically configure electronic menus. The parameters may thus be provided directly to the merchant devices by a means for providing test parameters, such as communications circuitry 208 acting under the control of merchant intelligence management circuitry 214 as described above with respect to FIG. 2.

At action 908, electronic marketing information relating to the test parameters is collected by the merchant intelligence platform. As noted above, the electronic marketing information may be collected from a variety of sources, including but not limited to discretionary data provided by consumer devices, transaction data provided by merchant devices, sensor data from sensors in communication with the merchant intelligence platform, or the like. In some embodiments, monitoring, gathering, or otherwise tracking of electronic marketing information related to the market analysis test may be initiated in response to beginning the test. For example, sensors, monitoring applications, or the like may begin monitoring particular characteristics of merchant-consumer interactions in response to those characteristics being identified as possibly being impacted by the market analysis test. The electronic marketing information may be received via means for receiving electronic marketing information, such as communications circuitry 208 as described above with respect to FIG. 2.

At action 910, embodiments may alter the parameters of the market analysis test. Embodiments with participation from a large number of merchants may be able to vary the test parameters across merchants and still obtain a statistically significant sample size. However, in tests with a single merchant or a small number of merchants, embodiments may instead alter the parameters of the test after obtaining an initial number of samples. Alternatively, in some embodiments test parameters may be determined dynamically or randomly, such that each individual consumer interaction for a particular merchant may be performed under different test parameters. The test parameters may be altered by means for altering test parameters, such as merchant intelligence management circuitry 214 as described above with respect to FIG. 2.

At action 912, electronic marketing information relating to the altered test parameters is collected in a similar manner as the initial electronic marketing information associated with the prior test parameters. As noted above, the electronic marketing information associated with the altered test parameters may be received via means for receiving electronic marketing information, such as communications circuitry 208 as described above with respect to FIG. 2.

At action 914, the results of the market analysis test are determined based on the gathered electronic marketing information. The results may indicate the level of correlation between the tested parameters and various aspects of the merchant-consumer relationship. For example, the results may indicate the expected benefit from incorporating the changed test parameters permanently. In some embodiments, the results may also include evaluation of other factors, such as a cost-benefit analysis of a change in the test parameter. For example, lowering the air conditioner temperature may result in an increase in customer satisfaction, but it may also entail a corresponding increase in utility bills. Embodiments may provide this data to the merchant to assist the merchant with determining whether to incorporate the changed parameter permanently. In yet further embodiments, the merchant intelligence platform may perform a complete analysis including estimation of the profitability of making a permanent change in test parameters, and automatically implement the test parameters that are predicted to provide the merchant with an optimal long-term benefit. The results of the market analysis test may be determined by means for determining the results of the market analysis, such as the merchant intelligence management circuitry 214 acting in concert with the analytics circuitry 212 as described above with respect to FIG. 2.

At action 916, the results of the market analysis test may be provided to the merchant device. As noted above, the results may be provided as a report or as a set of permanent changes sent to configure one or more of the merchant devices based on the results of the test. In some embodiments, the merchant intelligence platform may also suggest further testing or additional test parameters for consideration based on the results of the test. The results of the test may be provided to the merchant device by means for providing the results of the market analysis test, such as communications circuitry 208 as described above with respect to FIG. 2.

Example Process for Providing Prepayment of Revenue Based on Evaluation of Electronic Marketing Information Via a Merchant Intelligence Platform As described above, embodiments of the merchant intelligence platform may also function to provide for automatic approval and prepayment of revenue to merchants that meet certain criteria based on an evaluation of electronic marketing information associated with the merchant. In particular, the inventors have identified that one of the problems with engaging merchants in the use of a promotion and marketing service is a delay between when the merchant offers a promotion via the promotion and marketing service and when the merchant begins to receive revenue from the offering of the promotion. To this end, embodiments of the merchant intelligence platform are capable of evaluating electronic marketing information to determine scenarios in which a merchant is highly likely to generate at least a threshold amount of revenue from a promotion offering. In such scenarios, embodiments of the present invention may employ a merchant intelligence platform to evaluate the expected revenue for a particular promotion offering, and, if the promotion meets a particular threshold, provide upfront payment to the merchant prior to or contemporaneously with offering the promotion for sale via the promotion and marketing service.

Turning to FIG. 10, example operations for identifying scenarios for prepayment of promotion revenue using a market intelligence platform are described. The operations illustrated in FIG. 10 may, for example, be performed by elements of the promotion and marketing service 102 (e.g., server 104) described with respect to FIG. 1, with the assistance of, and/or under the control of one or more devices, such as apparatus 200. In particular, embodiments of a process 1000 may be performed by merchant intelligence management circuitry 214 acting in concert with analytics circuitry 212 and promotion generation circuitry 210 as described above with respect to FIG. 2.

The process 1000 depicted in FIG. 10 allows for the use of business analytics information to determine whether the quality of the promotion offered by the merchant is sufficiently high in order to justify the risk that the promotion and marketing service will not be able to recoup the revenue paid out to the merchant from sales of the promotion. To this end, embodiments may utilize a merchant intelligence platform to determine the expected demand for a particular promotion and, based on the expected demand, determine a revenue amount to prepay to the merchant. At action 1002, the process begins by receiving a request from a merchant to provide a new promotion. The request may be received via means for receiving the request for a promotion, such as communications circuitry 208 as described above with respect to FIG. 2.

At action 1004, expected performance metrics are determined for the promotion. To determine the expected performance metrics, embodiments may utilize various signals, electronic marketing information, and business analytic data received by and/or generated by the market intelligence platform. For example, the performance metrics may be determined based on past sales of similar promotions, past promotion offerings from the same merchant, various quality and desirability metrics associated with the merchant, the price of the promotion, and the like. The expected performance metrics may include an estimation of the number of promotions that will be sold, the frequency with which the promotions will sell, the expected average time between sale and redemption of the promotion, and the like. Determination of the expected performance metrics may be performed by means for determining the performance metrics, such as merchant intelligence management circuitry 214 acting in concert with analytics circuitry 212.

At action 1006, a determination is made as to whether the expected performance metrics meet a prepayment threshold for providing prepayment for the promotion. In general, the prepayment threshold may be set such that the promotion and marketing service has a reasonably high confidence interval (e.g., 95%) of recouping any compensation paid to the merchant within a particular time frame (e.g., within 1 month). In some embodiments, the prepayment threshold may be dynamically set based on a variety of factors, including but not limited to the number of similar promotions being offered by the promotion and marketing service, the number of similar merchants registered with the promotion and marketing service, the number of promotions associated with the same or a similar location as the merchant, a quality measurement for the merchant (e.g., an average review score provided on a review website, or a score provided by an internal quality measurement tool), the price of the promotion, or the like. The determination as to whether the performance metrics for the promotion meet or exceed the prepayment threshold may be performed by means for determining whether the expected performance metrics exceed the prepayment threshold, such as the merchant intelligence management circuitry 214 described above with respect to FIG. 2.

At action 1008, if the expected performance metrics exceed the prepayment threshold the expected revenue from the promotion is determined. The expected revenue may reflect the total amount received by the promotion and marketing service from consumers in exchange for providing the promotion. The expected revenue may control the amount paid to the merchant under the prepayment program, such that the larger the expected revenue, the greater the prepayment. The determination of the expected revenue may be performed by means for determining the expected revenue from the promotion, such as analytics circuitry 212 and/or merchant intelligence management circuitry 214 as described above with respect to FIG. 2.

At action 1010, at least a portion of the expected revenue is provided to the merchant. In this manner, embodiments may facilitate the electronic transfer of funds to a merchant account automatically based on the merchant wishing to initiate a promotion that satisfies the performance metrics necessary to overcome the prepayment threshold. In this manner, embodiments may facilitate the programmatic transfer of funds, such as initiation of a wire transfer or crediting a merchant account maintained by the promotion and marketing service. In some embodiments, the amount of funds transferred as a prepayment reflects a certain percentage of the expected revenue (e.g., 10%, 20%, 50%, or the like). In some embodiments, the percentage of revenue transferred varies based on certain factors. For example, a merchant that has offered several successful promotions via the promotion and marketing service may be credited with a larger percentage than a merchant who has never offered a promotion before. It should also be appreciated that, although the instant example describes an "all or nothing" scenario, various embodiments may provide for a wide range of prepayment values reflecting the risk to the promotion and marketing service that the payment will not be recouped from promotion sales. The payment of the expected revenue to the merchant may be facilitated by means for providing prepayment of the expected revenue, such as the merchant intelligence management circuitry 214 described above with respect to FIG. 2.

At action 1012, the promotion is offered by the promotion and marketing service after paying out the prepayment to the merchant. At action 1014, if the prepayment threshold is not exceeded, than no prepayment may be offered to the merchant and the promotion may be offered by the promotion and marketing service. The promotion may be offered by means for offering the promotion, such as the promotion management circuitry 210 described above with respect to FIG. 2. It should also be appreciated that, in some embodiments, alternative action may be taken if the prepayment threshold is not exceeded. For example, embodiments may suggest alternative promotion parameters to the merchant that would exceed the performance metrics required to overcome the prepayment threshold, or prepayment may be provided under different terms (e.g., as a loan with an interest rate commensurate with the risk that the promotion will not sell sufficiently to return the revenue to the promotion and marketing service).

Example Process for Programmatically Generating Promotions Via a Merchant Intelligence Platform As described above, example embodiments of the merchant intelligence platform may also provide merchants with the ability to configure the merchant intelligence platform for programmatic alteration and automation of various business processes based on received electronic marketing information and generated business analytic data. Some embodiments may allow a merchant to provide simple commands or requests to the merchant intelligence platform (e.g., via a merchant device such as a smart phone, smart watch, or other wearable) and the merchant intelligence platform will take appropriate action. For example, the merchant may speak into their merchant device, "Bring in some customers," and the merchant intelligence platform will automatically analyze conditions such as the local demand, time of day, current conditions at the merchant (e.g., number of empty tables, inventory levels), and make alterations to the merchant's systems configured to interface with the merchant intelligence platform that achieve the result desired by the merchant. One particular method of achieving such results is the programmatic generation of promotions. For example, instead of manually selecting the exact terms for a promotion offering, the merchant may instead allow the merchant intelligence platform to determine an appropriate promotion that will satisfy the request of the merchant, subject to any constraints previously established by the merchant. Furthermore, in some embodiments the merchant may preconfigure the merchant intelligence platform to generate such promotions in response to certain signals or criteria without requiring a further affirmative act on the part of the merchant. In this manner, the merchant can set up trigger conditions such as "If it is Saturday night and more than 5 tables are empty, generate a low quantity, high discount promotion with a fast expiration timer."

Turning to FIG. 11, example operations for programmatic generation of promotions using a merchant intelligence platform are described. The operations illustrated in FIG. 11 may, for example, be performed by elements of the promotion and marketing service 102 (e.g., server 104) described with respect to FIG. 1, with the assistance of, and/or under the control of one or more devices, such as apparatus 200. In particular, embodiments of a process 1100 may be performed by merchant intelligence management circuitry 214 acting in concert with analytics circuitry 212 as described above with respect to FIG. 2.

FIG. 11 illustrates a flowchart describing example operations for programmatic generation of promotions in accordance with some example embodiments of the present invention. At action 1102, a request is received indicating a desired promotion outcome. Possible desired outcomes may be defined by a merchant intelligence platform interface and communicated to the merchant. For example, a merchant may provide a market intelligence platform with a request for a desired outcome such as, "Bring in 5 new customers," or "Fill my empty tables," or "Generate $5,000 in revenue." In some embodiments, the merchant may specify recurring desired outcomes. For example, the merchant may specify, "If it is Friday or Saturday at 8:00 pm and I have at least 5 empty tables, bring in 5 new customers." In some embodiments, trigger conditions for initiating a promotion outcome request may also be determined with the assistance of data received via external sources. For example, a merchant may wish to programmatically generate promotions using local events (e.g., concerts, gatherings, festivals, events, holidays, or the like) as triggers, based on data provided by electronic calendar applications, websites for local venues, or the like. As a particular example, a bar may configure embodiments of the merchant intelligence platform to programmatically generate a promotion outcome request in response to determining that a concert is scheduled at a venue across the street from the bar and the bar is not already full. The triggering of criteria defined in such a recurring desired outcome may result in initiation of a promotion outcome request being used to generate a new promotion in the same manner as if the merchant had affirmatively provided the outcome request.

As noted above, the promotion outcome request may be provided in a variety of manners using a variety of merchant devices. For example, the merchant may utilize a web interface to notify the merchant intelligence platform of the desired outcome, the merchant may speak into a wearable device, or the merchant may utilize an application desired to provide an interface to the merchant intelligence platform. The promotion outcome request may be received via the merchant intelligence platform via means for receiving the promotion outcome request such as the communications circuitry 208 or input/output circuitry 206 described with respect to FIG. 2.

At action 1104, the merchant intelligence platform determines a set of predicted promotion outcomes for a set of promotions based on analytic data. As described above, embodiments of the merchant intelligence platform may be able to determine the expected outcomes for particular configurations of promotions based on analysis of the past performance of similar promotions, knowledge of the target market, and the like. In this manner, business analytic data generated by analytic circuitry may be employed to determine the predicted promotion outcomes for the set of promotions that may be generated in response to the promotion outcome request. In some embodiments, promotions are associated with a particular likelihood that they will have a given outcome. For example, a promotion may be associated with a 10% likelihood of bringing in at least 50 new customers, a 30% likelihood of bringing in at least 20 new customers, a 50% likelihood of bringing in at least 10 new customers, and a 90% likelihood of bringing in at least 5 new customers.

The predicted promotion outcomes may be determined by means for predicting promotion outcomes, such as market intelligence management circuitry 214 acting in concert with analytics circuitry 212 as described above with respect to FIG. 2.

At action 1106, embodiments may select one or more promotions from the set of promotions based on the predicted outcome of the one or more selected promotions. To this end, embodiments may select a set of promotions that provide an outcome consistent with the promotion outcome request. For example, if the promotion outcome request includes a request to fill the empty tables in a restaurant for that evening, a promotion may be selected that desirable enough to entice at least a sufficient number of customers to fill the remaining empty seats. In some embodiments, selection of the promotion may further include receiving additional context data regarding the promotion outcome request. For example, if the merchant's request is a capacity request (e.g., "Fill my empty tables with customers,") then embodiments may gather data indicating how many tables are empty, such as by interfacing with a point-of-sale device or capacity management application. In some embodiments, selection of a particular promotion may require that the promotion have at least a threshold likelihood of providing the desired outcome. For example, a promotion may only be selected if the promotion has at least a 75%, 90%, or 95% likelihood of satisfying the merchant's request. It should also be appreciated that some embodiments may incorporate a "closed loop" or machine learning system whereby likelihoods of particular outcomes for particular promotions are influenced by the success of failure of those promotions or similar promotions of providing those outcomes for previous requests.

In some embodiments, the promotion outcome request may specify a minimum threshold metric for automatically running a new promotion. For example, if the merchant wishes to fill five empty tables, then promotions that are only likely to entice three new customers may be excluded from consideration, even if those promotions would result in a greater revenue boost for the merchant. In some embodiments, promotion components may be selected to optimize for the desired outcome. For example, if a certain low promotion price is likely to entice ten new customers, and a higher promotion price is only likely to entice five new customers, the higher promotion price would be selected in response to a promotion outcome request indicating a desire for five new customers, while the lower promotion price might be selected if the promotion outcome request indicated a desire for ten new customers. In some embodiments, selection of promotions may also be subject to additional rules. For example, promotions or particular promotion components may only be selectable for an automated promotion generation process if the promotions are associated with a certain minimum return-on-investment (ROI) value. Promotions that are below a particular ROI value may require manual acceptance or verification by the merchant and/or promotion and marketing service. Selection of the promotion conforming to the requested promotion outcome may be performed by means for selecting a promotion conforming to the requested promotion outcome, such as the merchant intelligence management circuitry 214 described above with respect to FIG. 2.

At action 1108, embodiments may offer the selected one or more promotions via a promotion and marketing service. Offering of these promotions may include generating promotions with promotion components that are likely to result in the outcome requested by the promotion outcome request. Generation of these promotions may include publishing the promotions to an e-commerce interface, such as provided by a website maintained by the promotion and marketing service or notifying one or more applications executing on consumer devices (e.g., smartphone "apps") of the publication of the selected promotions. In some embodiments, promotions generated in this manner may be immediately sent as notifications to consumers meeting certain criteria. For example, if the requested promotion outcome was to fill the empty tables the same evening, the promotion may be published with a short expiration time and sent to consumers that are either close to the merchant's location physically or that have a prior relationship with the merchant (e.g., they have previously patronized the merchant). For promotions outcomes that are not as urgent (e.g., the promotion outcome request defines a longer time period, such as multiple weeks), less aggressive marketing strategies may be used (e.g., promotions may offer less of a discount or a longer expiration period). Offering of the promotion via the promotion and marketing service may be performed by means for offering promotions for a promotion and marketing service, such as the promotion management circuitry 210 described above with respect to FIG. 1.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for providing a merchant intelligence platform, the apparatus comprising at least one processor, communication circuitry associated with a network comprising a plurality of merchant devices and a consumer device, and at least one memory storing instructions that with the at least one processor, cause the apparatus to:
receive, by the at least one processor via the network, a first electronic inquiry, the first electronic inquiry comprising a first request to initiate a market analysis test, wherein the market analysis test is associated with one or more parameters;
determine, by the at least one processor via the network, a first configuration change to apply in the market analysis test, the first configuration change comprising an alteration in at least one of an ambient temperature of a merchant location, an ambient lighting level of the merchant location, or first content rendered on a display at the merchant location;
transmit, by the at least one processor via the network, the first configuration change to at least one first merchant device for the at least one first merchant device to apply the first configuration change at the merchant location;
based at least in part on transmitting the first configuration change to the at least one first merchant device, cause the at least one first merchant device to apply the first configuration change at the merchant location;
receive, by the at least one processor via the network, electronic marketing information with responsive to the first configuration change applied by the at least one first merchant device, wherein the electronic marketing information comprises first electronic data related to operation of merchant devices and/or consumer devices at the merchant location following the first configuration change;
generate, by the at least one processor, business analytic data based at least in part on the received electronic marketing information at a substantially constant rate, wherein the business analytic data is generated and stored in a transmission memory buffer, such that the business analytic data is ready to transmit in real-time to dynamically update the display of the at least one first merchant device in response to at least a received electronic inquiry and a first trigger condition, and wherein the business analytic data is incorporated into a demand model that reflects additional electronic marketing information comprising demographics, preferences, and behavior of consumers of a geographic area;
in response to the first electronic inquiry, automatically transmit, by the at least one processor via the network to the at least one merchant device, at least a portion of the business analytic data stored in the transmission memory buffer, the at least a portion of the business analytic data being generated and stored in the transmission memory buffer at a moment in time most recent to receiving the electronic inquiry;
determine, by the at least one processor, whether at least the first trigger condition associated with a local event is satisfied based on data associated with a website for a venue of the geographic area;
responsive to determining that at least the first trigger condition associated with a local event is satisfied, automatically generate, by the at least one processor and based at least in part on the demand model, a promotion associated with the local event associated with the geographic area; and
transmit, by the at least one processor via the network to the at least one first merchant device associated with a first merchant, an electronic notification of the promotion and a correlation between at least one of the one or more parameters associated with the market analysis test and the electronic marketing information responsive to the first configuration change, wherein the correlation represents an expected benefit from incorporating the alteration to first content of the first configuration change;

wherein the electronic notification is associated with at least a consumer of the consumer device that provided at least partially the additional electronic marketing information, and wherein the consumer device is configured to receive application alerts associated with the promotion before an expiration of a particular time period of the local event;

wherein the one or more parameters of the market analysis test are determined based at least in part on the first request;

wherein the market analysis test is initiated in response to receiving the first request and determining the one or more parameters associated with the market analysis test; and wherein the first configuration change for at least one first merchant device associated with a first merchant is determined based at least in part on the one or more parameters associated with the market analysis test.

2. The apparatus of claim 1, wherein the at least one memory stores instructions that, with the at least one processor, further cause the apparatus to:

receive a second electronic inquiry from a second merchant via a network interface, the second electronic inquiry comprising a second request to participate in the market analysis test;

determine and generate a second configuration change to apply in the market analysis test, the second configuration change comprising a second alteration in at least one of an ambient temperature of a second merchant location, an ambient lighting level of the merchant location, or second content rendered on a display at the second merchant location;

transmit, via the network, the second configuration change to at least one second merchant device for the at least one second merchant device to apply the second configuration change at the second merchant location; and based at least in part on transmitting the second configuration change to the at least one second merchant device, cause the at least one second merchant device to apply the second configuration change at the second merchant location, wherein the electronic marketing information further comprises second electronic data related to operation merchant devices and/or consumer devices at the second merchant location following the second configuration change.

3. The apparatus of claim 2, wherein the at least one processor is further configured to:

determine that the first merchant does not provide a statistically significant sample size to identify a statistically significant correlation between the first configuration change of the market analysis test and the electronic marketing information; and allow participation of the second merchant in the market analysis test in response to determining that the first merchant does not provide the statistically significant sample size.

4. The apparatus of claim 3, wherein an ability of the first merchant to provide a statistically significant sample size is determined at least in part based on prior transaction data provided by the first merchant.

5. The apparatus of claim 1, further configured to:

determine and generate an additional configuration change based at least in part on the one or more parameters associated with the market analysis test, wherein the additional configuration change is different from the first configuration change;

transmit, via the network, the additional configuration change to the at least one first merchant device for the at least one first merchant to apply the additional configuration change at the merchant location; and based at least in part on transmitting the additional configuration change to the at least one first merchant device, cause the at least one first merchant device to apply the additional configuration change at the merchant location, wherein the electronic marketing information further comprises additional electronic data related to operation of the plurality of merchant devices following the additional configuration change.

6. The apparatus of claim 1, wherein the at least one processor is further configured to determine that the electronic marketing information indicates a statistically significant sample size associated with the first configuration change.

7. The apparatus of claim 6, wherein the at least one processor is further configured to revert the first configuration change in response to determining that the electronic marketing information indicates the statistically significant sample size.

8. The apparatus of claim 6, wherein the at least one processor is further configured to determine the correlation in response to determining that the electronic marketing information indicates the statistically significant sample size.

9. The apparatus of claim 1, wherein the website for the venue of the geographic area comprises an electronic calendar application that indicates one or more of concerts, gatherings, festivals, events, or holidays.

10. The apparatus of claim 1, wherein the at least one memory storing the instructions that, with the at least one processor, further cause the apparatus to:

transmit, by the at least one processor via at least the network, the promotion to an e-commerce interface associated with a particular website; and transmit, by the at least one processor via at least the network, the promotion to at least the consumer device associated with the geographic area within the particular time period of the local event.

11. The apparatus of claim 10, wherein the at least one memory storing the instructions that, with the at least one processor, further cause the apparatus to:

receive, by the at least one processor via at least the network from a plurality of consumer devices associated with the consumers of the geographic area, the additional electronic marketing information, wherein the additional electronic marketing information is at least partially collected by each consumer device of the plurality of consumer devices via at least an application of the merchant intelligence platform configured to receive at least the application alerts, and wherein the consumer device is one of the plurality of consumer devices.

12. The apparatus of claim 10, wherein the particular website is the website for the venue of the geographic area.

13. A non-transitory computer readable storage medium comprising instructions that, when executed by a processor, cause the processor to:

receive, via at least a network, a first electronic inquiry, the first electronic inquiry comprising a first request to initiate a market analysis test;

determine one or more parameters of the market analysis test based at least in part on the first electronic inquiry;

determine and generate a first configuration change to apply in the market analysis test, the first configuration change comprising an alteration in at least one of an ambient temperature of a merchant location, an ambient lighting level of the merchant location, or first content rendered on a display at the merchant location;

transmit, via the network, the first configuration change to at least one first merchant device for the at least one first merchant device to apply the first configuration change at the merchant location;

based at least in part on transmitting the first configuration change to the at least one first merchant device, cause the at least one first merchant device to apply the first configuration change at the merchant location;

receive, via at least the network, electronic marketing information responsive to the first configuration change applied by the at least one first merchant device, wherein the electronic marketing information comprises first electronic data related to operation of merchant devices and/or consumer devices at the merchant location following the first configuration change;

generate business analytic data based at least in part on the received electronic marketing information at a substantially constant rate, wherein the business analytic data is generated and stored in a transmission memory buffer such that the business analytic data is ready to transmit in real-time to dynamically update the display of the at least one first merchant device in response to at least a received electronic inquiry and a first trigger condition, and wherein the business analytic data is incorporated into a demand model that reflects additional electronic marketing information comprising demographics, preferences, and behavior of consumers of a geographic area;

in response to the first electronic inquiry, automatically transmit, via the network to the at least one merchant device, at least a portion of the business analytic data stored in the transmission memory buffer, the at least a portion of the business analytic data being generated and stored in the transmission memory buffer at a moment in time most recent to receiving the electronic inquiry;

determine a correlation between at least one of the one or more parameters associated with the market analysis test and the electronic marketing information associated with the alteration to the first content;

determine whether at least the first trigger condition associated with a local event is satisfied based on data associated with a website for a venue of the geographic area;

responsive to determining that at least the first trigger condition associated with a local event is satisfied, automatically generate, based at least in part on the demand model, a promotion associated with the local event associated with the geographic area; and transmit, via at least the network to the at least one first merchant device associated with a first merchant, an electronic notification of the promotion and the correlation, wherein the correlation represents an expected benefit from incorporating the alteration to first content of the first configuration change;

wherein the electronic notification is associated with at least a consumer of a consumer device that provided at least partially the additional electronic marketing information, and wherein the consumer device is configured to receive application alerts associated with the promotion before an expiration of a particular time period of the local event.

14. The non-transitory computer readable storage medium of claim 13, wherein the instructions further cause the processor to:

receive, via at least the network, a second electronic inquiry from a second merchant via a network interface, the second electronic inquiry comprising a second request to participate in the market analysis test;

determine and generate, a second configuration change to apply in the market analysis test, the second configuration change comprising a second alteration in at least one of an ambient temperature of a second merchant location, an ambient lighting level of the merchant location, or second content rendered on a display at the second merchant location;

transmit, via the network, the second configuration change to at least one second merchant device; and based at least in part on transmitting the second configuration change to the at least one first merchant device, cause the at least one second merchant device to apply the second configuration change at the second merchant location, wherein the electronic marketing information further comprises second electronic data related to operation of merchant devices and/or consumer devices at the second merchant location following the second configuration change.

15. The non-transitory computer readable storage medium of claim 14, wherein the instructions further cause the processor to:

determine that the first merchant does not provide a statistically significant sample size to identify a statistically significant correlation between the first configuration change of the market analysis test and the electronic marketing information; and allow participation of the second merchant in the market analysis test in response to determining that the first merchant does not provide the statistically significant sample size.

16. The non-transitory computer readable storage medium of claim 13, wherein the instructions further cause the processor to:

determine and generate an additional configuration change based at least in part on the one or more parameters associated with the market analysis test, wherein the additional configuration change is different from the first configuration change;

transmit, via the network, the additional configuration change to the at least one first merchant device for the at least one first merchant to apply the additional configuration change at the merchant location; and based at least in part on transmitting the additional configuration change to the at least one first merchant device, cause the at least one first merchant device to apply the additional configuration change at the merchant location, wherein the electronic marketing information further comprises additional electronic data related to operation of the plurality of merchant devices following the additional configuration change.

17. The non-transitory computer readable storage medium of claim 13, wherein the instructions further cause the processor to determine that the electronic marketing information indicates a statistically significant sample size associated with the first configuration change.

18. A method for providing market analysis testing using a merchant intelligence platform comprising:

receiving, via at least a network, a first electronic inquiry via a network interface, the first electronic inquiry comprising a first request to initiate a market analysis test;

determining one or more parameters of the market analysis test based at least in part on the first electronic inquiry;

determining and generating a first configuration change to apply in the market analysis test, the first configuration change comprising an alteration in at least one of an ambient temperature of a merchant location, an ambient lighting level of the merchant location, or first content rendered on a display at the merchant location;

transmitting, via the network, the first configuration change to at least one first merchant device for the at least one first merchant device to apply the first configuration change at the merchant location;

based at least in part on transmitting the first configuration change to the at least one first merchant device, causing the at least one first merchant device to apply the first configuration change at the merchant location;

receiving, via at least the network, electronic marketing information response to the first configuration change applied by the at least one first merchant device, wherein the electronic marketing information comprises first electronic data related to operation of merchant devices and/or consumer devices at the merchant location following the first configuration change;

generating business analytic data based at least in part on the received electronic marketing information at a substantially constant rate, wherein the business analytic data is generated and stored in a transmission memory buffer such that the business analytic data is ready to transmit in real-time to dynamically update the display of the at least one first merchant device in response to at least a received electronic inquiry and a first trigger condition, wherein the business analytic data is incorporated into a demand model that reflects additional electronic marketing information comprising demographics, preferences, and behavior of consumers of a geographic area;

in response to the first electronic inquiry, automatically transmit, via the network to the at least one merchant device, at least a portion of the business analytic data stored in the transmission memory buffer, the at least a portion of the business analytic data being generated and stored in the transmission memory buffer at a moment in time most recent to receiving the electronic inquiry;

determining a correlation between at least one of the one or more parameters of the market analysis test and the electronic marketing information associated with the alteration to the first content;

determining that at least the first trigger condition associated with a local event is satisfied based on data associated with a website for a venue of the geographic area;

responsive to determining that at least the first trigger condition associated with a local event is satisfied, automatically generating, based on the demand model, a promotion associated with the local event associated with the geographic area;

transmitting, via the network to the at least one first merchant device associated with a first merchant, an electronic notification of the promotion and the correlation, wherein the correlation represents an expected benefit from incorporating the alteration to first content of the first configuration change; and wherein the electronic notification is associated with at least a consumer of a consumer device that provided at least partially the additional electronic marketing information, and wherein the consumer device is configured to receive application alerts associated with the promotion before an expiration of a particular time period of the local event.

19. The method of claim 18, further comprising:

receiving, via at least the network, a second electronic inquiry from a second merchant via the second electronic inquiry comprising a second request to participate in the market analysis test;

determining and generating a second configuration change to apply in the market analysis test, the second configuration change comprising a second alteration in at least one of an ambient temperature of a second merchant location, an ambient lighting level of the merchant location, or second content rendered on a display at the second merchant location;

transmitting, via the network, the second configuration change to at least one second merchant device for the at least one second merchant device to apply the second configuration change at the second merchant location; and based at least in part on transmitting the second configuration change to the at least one second merchant device, causing the at least one second merchant device to apply the second configuration change at the second merchant location, wherein the electronic marketing information further comprises second electronic data related to operation of merchant devices and/or consumer devices at the second merchant location following the second configuration change.

* * * * *